(12) United States Patent
Kondos et al.

(10) Patent No.: US 6,203,913 B1
(45) Date of Patent: Mar. 20, 2001

(54) COATING COMPOSITION FOR PLASTIC SUBSTRATES

(75) Inventors: Constantine A. Kondos, Pittsburgh; Edward E. McEntire, Allison Park; Masayuki Nakajima, Wexford; Richard M. Nugent, Jr., Allison Park, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/212,784

(22) Filed: Dec. 16, 1998

Related U.S. Application Data
(60) Provisional application No. 60/068,188, filed on Dec. 19, 1997.

(51) Int. Cl.$^7$ .............. C09D 133/02; C09D 161/20; C09D 167/02; C09D 175/04
(52) U.S. Cl. .............. 428/423.1; 525/155; 525/156; 525/162; 525/167; 525/177; 525/194; 525/313; 525/328.2; 525/328.8; 525/330.3; 525/454; 525/455; 525/456; 525/518; 525/131; 428/423.1; 428/482; 428/521; 428/522; 428/524
(58) Field of Search .............. 525/155, 156, 525/162, 518, 167, 177, 443, 445, 131, 454, 455, 456, 194, 313, 328.2, 328.8, 330.3; 428/524, 521, 522, 482, 423.1

(56) References Cited

U.S. PATENT DOCUMENTS

| | | | |
|---|---|---|---|
| Re. 27,145 | 6/1971 | Jones | 260/880 |
| 3,652,732 | 3/1972 | Makowski et al. | 260/880 B |
| 3,979,547 | 9/1976 | Roberts, Jr. et al. | 428/423 |
| 4,020,125 | 4/1977 | Suzuki et al. | 260/859 R |
| 4,039,593 | 8/1977 | Kamienski et al. | 260/635 E |
| 4,093,593 | 6/1978 | Go | 260/45.85 P |
| 4,147,688 | 4/1979 | Makhlouf et al. | 260/33.6 EP |
| 4,518,753 | 5/1985 | Richards et al. | 526/177 |
| 4,764,430 | 8/1988 | Blackburn et al. | 428/413 |
| 4,866,120 | 9/1989 | Rudnick et al. | 524/849 |
| 4,997,882 | 3/1991 | Martz et al. | 525/65 |
| 5,039,755 | 8/1991 | Chamberlain et al. | 525/338 |
| 5,115,007 | 5/1992 | Chihara et al. | 524/267 |
| 5,214,101 | 5/1993 | Pettit, Jr. et al. | 525/176 |
| 5,221,707 | 6/1993 | Chihara et al. | 524/267 |
| 5,319,032 | 6/1994 | Martz et al. | 525/301 |
| 5,358,981 | 10/1994 | Southwick | 523/402 |
| 5,376,745 | 12/1994 | Handlin, Jr. et al. | 526/178 |
| 5,378,761 | 1/1995 | St. Clair | 525/111 |
| 5,397,602 | 3/1995 | Martz et al. | 427/343.5 |
| 5,405,911 | 4/1995 | Handlin, Jr. et al. | 525/139 |
| 5,416,168 | 5/1995 | Willis et al. | 525/333.2 |
| 5,436,079 | 7/1995 | Brugel | 428/483 |
| 5,446,104 | 8/1995 | Handlin, Jr. et al. | 525/314 |
| 5,459,200 | 10/1995 | St. Clair | 525/131 |
| 5,486,570 | 1/1996 | St. Clair | 525/123 |
| 5,500,481 | 3/1996 | St. Clair | 525/92 K |
| 5,554,691 | 9/1996 | St. Clair | 525/111 |
| 5,594,072 | 1/1997 | Handlin, Jr. et al. | 525/314 |
| 5,612,407 | 3/1997 | Southwick | 524/571 |
| 5,688,598 | * 11/1997 | Keck | 428/458 |
| 5,721,317 | 2/1998 | St. Clair et al. | 525/98 |
| 5,863,646 | 1/1999 | Verardi et al. | 428/323 |
| 6,001,469 | * 12/1999 | Verardi | 428/333 |

FOREIGN PATENT DOCUMENTS

| | | |
|---|---|---|
| 0 601 665 | 12/1993 | (EP) . |
| 0 698 638 | 1/1998 | (EP) . |
| WO96/11238 | 4/1996 | (WO) . |
| WO96/11241 | 4/1996 | (WO) . |

OTHER PUBLICATIONS

D. St. Clair, "Coating Resins based on Melamine Cured Polyolefin Diol" Technical Paper presented at TPO's in Automotive '96 Conference, Executive Conference Management (Oct. 28–30, 1996), Novi, Michigan.

M. Mikulec, Are the Low Viscosity Functionalized Olefinic Polymers Feasible as Components in Coatings to Adhere to Untreated TPO Substrate?(1996).

"Solubility Parameters" from Encyclopedia of Chemical Technology, Suppl. vol., 2nd Edition, 1971, pp. 889–909.

* cited by examiner

*Primary Examiner*—Patricia A. Short
(74) *Attorney, Agent, or Firm*—Anna Marie Cannoni; Deborah M. Altman

(57) ABSTRACT

The present invention provides coating compositions including: (a) about 75 to about 99.9 weight percent of a crosslinkable film-forming system including one or more crosslinkable film-forming resins and one or more crosslinking materials which is capable of reacting with the film-forming resin to form a crosslinked film; and (b) one or more substantially saturated, predominantly hydrocarbon adhesion promoting agents having an average of more than one pendant or terminal polar group per molecule which are capable of reacting with the crosslinking material, the adhesion promoting agent(s) being present in an amount ranging from about 0.1 to about 25 weight percent on a basis of total resin solids of the coating composition. The coating compositions are useful for directly coating surfaces of thermoplastic and thermosetting plastic substrates, such as TPO and RIM, without the aid of flame or corona pretreatment, or the use of an adhesion promoter. Plastic articles coated with the coating compositions are also disclosed.

17 Claims, No Drawings

COATING COMPOSITION FOR PLASTIC SUBSTRATES

CROSS REFERENCE TO RELATED PATENT APPLICATION

This patent application is related to U.S. provisional patent application Ser. No. 60/068,188 entitled "Coating Composition for Plastic Substrates", filed Dec. 19, 1997.

FIELD OF THE INVENTION

The present invention relates to coating compositions for thermoplastic and thermosetting plastic materials and the coated plastic articles.

BACKGROUND OF THE INVENTION

Plastic materials such as thermoplastic olefin (TPO) and reaction injected molding urethane (RIM) have been developed which are useful in many applications, such as automobile parts and accessories, containers, household appliances and other commercial items. It is often desirable to coat articles made from such plastic materials with organic coating compositions to decorate them or to protect the plastic materials from degradation when exposed to atmospheric weathering conditions such as sunlight, moisture, heat and cold. To achieve longer lasting and more durable parts, it is necessary for the coatings to be tightly adhered to the surface of the plastic.

Plastic substrates made from a variety of thermoplastic and thermosetting plastic materials have widely varying surface properties, including surface tension, roughness and flexibility, which make it difficult to achieve adequate adhesion of the organic coatings to such materials, particularly after aging or environmental exposure of the plastic materials. It is well known that to properly adhere coatings to some plastic materials, an adhesion promoter or tie coat can be used. The application of an adhesion promoter or tie coat is normally an added step in the coating process. The adhesion promoter is usually applied in a thin layer, normally about 0.25 mils (6.35 microns ($\mu$m)). Typically, adhesion promoters used on TPO plastic surfaces contain chlorinated polyolefins, some examples of which are described in U.S. Pat. Nos. 4,997,882; 5,319,032 and 5,397,602. Additionally, flame or corona pretreatment steps can be used to facilitate adequate adhesion of organic coatings to some plastic substrates.

The use of adhesion promoters and corona pretreatments in a coating system used to coat plastic substrates adds complexity and cost to the system. The application of an adhesion promoter usually entails coating the plastic substrate with the promoter, followed by some drying or curing time which increases the time of the entire coating process and will usually necessitate additional workspace. Accordingly, coating compositions which exhibit excellent adhesion directly to plastic materials such as TPO and RIM without the use of adhesion promoters or tie coats are desirable.

Polyolefin diols have been used in coating compositions to impart adhesion to the plastic substrate without the use of adhesion promoters or tie coats. However, polyolefin diols may be incompatible with the resins and/or crosslinking agents used in some coating compositions.

SUMMARY OF THE INVENTION

The present invention provides a coating composition comprising: (a) a crosslinkable film-forming system present in an amount ranging from about 75 to about 99.9 weight percent on a basis of total resin solids of the coating composition, the crosslinkable film-forming system comprising: (i) at least one crosslinkable film-forming resin; and (ii) at least one crosslinking material selected from the group consisting of aminoplasts, polyacids, anhydrides and mixtures thereof, the at least one crosslinking material being capable of reacting with the film-forming resin to form a crosslinked film; and (b) at least one substantially saturated, predominantly hydrocarbon adhesion promoting agent having an average of more than one pendant or terminal polar group per molecule which is capable of reacting with the crosslinking material, the at least one adhesion promoting agent being present in an amount ranging from about 0.1 to about 25 weight percent on a basis of total resin solids of the coating composition.

Another aspect of the present invention is a coating composition comprising (a) a crosslinkable film-forming system present in an amount ranging from about 75 to about 99.9 weight percent on a basis of total resin solids of the coating composition, the crosslinkable film-forming system comprising: (i) at least one crosslinkable film-forming resin; and (ii) at least one isocyanate-containing crosslinking material which is capable of reacting with the film-forming resin to form a crosslinked film; and (b) at least one substantially saturated, predominantly hydrocarbon adhesion promoting agent having an average of more than one pendant or terminal polar group per molecule which is capable of reacting with the crosslinking material, the at least one adhesion promoting agent being present in an amount ranging from about 0.1 to about 25 weight percent on a basis of total resin solids of the coating composition, wherein the coating composition is essentially free of monohydroxylated diene polymers and the equivalent ratio of isocyanate-functional groups of the isocyanate-containing crosslinking material to polar groups of the film-forming resin and/or adhesion promoting agent is greater than 0.8:1.

Yet another aspect of the present invention is a coating composition comprising: (a) at least one crosslinkable film-forming resin; (b) at least one crosslinking material; (c) at least one substantially saturated, predominantly hydrocarbon adhesion promoting agent having at least one pendant or terminal polar group that is reactive with the crosslinking material; and (d) at least one compatibilizer selected from the group consisting of hydrocarbon alcohols containing at least twelve contiguous carbon atoms and resinous materials containing at least one pendent or internal hydrocarbon chain containing at least eight contiguous carbon atoms.

Another aspect of the present invention is a coating composition comprising: (a) at least one substantially saturated, predominantly hydrocarbon adhesion promoting agent having at least one pendant or terminal polar group that is reactive with a crosslinking material; and (b) at least one resinous compatibilizer having at least one pendent or internal hydrocarbon chain containing at least eight contiguous carbon atoms; and (c) at least one crosslinking material which is capable of reacting with the compatibilizer to form a crosslinked film.

The present invention also provides plastic articles coated with the above coating compositions.

DETAILED DESCRIPTION OF THE PREFERRED EMBODIMENTS

Unless otherwise specified, all of the numerical ranges, amounts, values and percentages, such as those for amounts of materials, times and temperatures of reaction, ratios of amounts, values for molecular weight, whether number average molecular weight ("Mn") or weight average molecular weight ("Mw"), and others in the following portion of the specification may be read as if prefaced by the word "about" even though the term "about" may not expressly appear with the value, amount or range. Also molecular weight quantities, whether Mn or Mw, are those determinable from gel permeation chromatography using polystyrene as standards. The term "equivalent weight" is a calculated value based on the relative amounts of the various ingredients used in making the specified material and is based on the solids of the specified material. The relative amounts are those that result in the theoretical weight in grams of the material like a polymer produced from the ingredients and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The coating compositions of the present invention are suitable for use as a primer applied directly to a plastic substrate, a colored topcoat applied directly to a plastic substrate, a colored basecoat applied directly to a plastic substrate that is subsequently topcoated with a clear topcoat in a basecoat-clearcoat coated composite, or a clear topcoat applied directly to a colored plastic substrate. As used herein, the term "plastic" is intended to include any of the thermoplastic or thermosetting synthetic materials commonly used in injection or reaction molding, sheet molding, or other similar process in which parts are formed, examples of which are given below. The terminology "direct to a plastic substrate" or similar terminology means that no flame or corona pretreatment, adhesion promoter or tie coat is needed prior to application of the coating compositions of the present invention.

The coating compositions of the present invention can be present in the form of a solid (such as a powder), liquid or mixtures thereof. Preferably, the coating composition is present in the form of a liquid or dispersion.

The coating compositions of the present invention comprise a crosslinkable film-forming system (which will be discussed in detail below) and one or more adhesion promoting agents. These adhesion promoting agents are one or more substantially saturated, predominantly or substantially hydrocarbon oligomers or polymers (hereinafter "Saturated Hydrocarbon Polymer") containing polar groups that are reactive with the crosslinking material of the crosslinkable film-forming system described below.

As used herein, "predominantly hydrocarbon polymer", means that the Saturated Hydrocarbon Polymer contains about 85 to about 99 weight percent of hydrocarbon units. The Saturated Hydrocarbon Polymer contains less than about 13 percent by weight of heteroatoms such as oxygen, nitrogen and sulfur. Preferably, the Saturated Hydrocarbon Polymer contains less than 6 percent by weight of heteroatoms, more preferably less than 3 percent, and most preferably less than 1 percent. Because of the minimal heteroatom content, the functional Saturated Hydrocarbon Polymer generally has a high molecular weight. Typically, the number average molecular weight of the Saturated Hydrocarbon Polymer ranges from about 1000 to 20,000.

The Saturated Hydrocarbon Polymer contains an average of more than one terminal or pendant polar group per molecule which is capable of reacting with the crosslinking material of the crosslinkable film-forming system. Preferably, the Saturated Hydrocarbon Polymer, which can be present as a mixture of different Saturated Hydrocarbon Polymers, contains an average of about 1.5 to about 6 terminal or pendent polar groups per molecule. More preferably, the Saturated Hydrocarbon Polymer contains two terminal polar groups per molecule.

The polar groups of the Saturated Hydrocarbon Polymer can be carboxyl groups, carbamate groups, hydroxyl groups, amino groups, amide groups, mercaptan groups and mixtures thereof. Preferably, the polar groups are hydroxyl groups. More preferably, the Saturated Hydrocarbon Polymer contains two terminal hydroxyl groups.

The Saturated Hydrocarbon Polymer is at least "substantially saturated", i.e., the hydrocarbon polymer has been hydrogenated, usually after polymerization, such that at least about 90 percent and preferably at least about 95 percent of the carbon to carbon double bonds of the hydrocarbon polymer are saturated. Methods for hydrogenating unsaturated hydrocarbon polymers are well known to those skilled in the art. Examples of useful hydrogenation processes include hydrogenation in the presence of such catalysts as Raney Nickel, noble metals such as platinum and the like, soluble transition metal catalysts and titanium catalysts as in U.S. Pat. No. 5,039,755, which is hereby incorporated by reference.

In a preferred embodiment, the Saturated Hydrocarbon Polymer comprises one or more substantially saturated polyhydroxylated polydiene polymers. Polyhydroxylated polydiene polymers made using isoprene or butadiene, as described in U.S. Pat. Nos. 5,486,570 and 5,376,745 (which are hereby incorporated by reference), which are substantially saturated, are suitable for use in the present invention. Preferably the Saturated Hydrocarbon Polymer is formed from saturated butadiene and is essentially free of saturated or unsaturated isoprene units, i.e., contains less than 5 weight percent saturated or unsaturated isoprene units. More preferably, the Saturated Hydrocarbon Polymer is free of saturated or unsaturated isoprene units. Polyhydroxylated polydiene polymers of this type generally have an hydroxyl equivalent weight of between about 500 and about 20,000. Preferably, the saturated polyhydroxylated polydiene polymer is a dihydroxy polybutadiene which contains about two terminal hydroxyl groups, one at each end of the polymer, and has a hydroxyl equivalent weight of about 1,000 to about 5000.

Suitable substantially saturated polyhydroxylated polydiene polymers include those synthesized by free radical polymerization of dienes or anionic polymerization of conjugated diene hydrocarbons, such as butadiene or isoprene, with lithium initiators. The process steps for preparing polyhydroxylated polydiene polymers by anionic polymerization are described in U.S. Pat. No. 4,039,593; Re. 27,145; and U.S. Pat. No. 5,376,745, which are hereby incorporated by reference. Such polymers are typically made with a di-lithium initiator, such as a compound formed by reaction of two moles of sec-butyllithium with one mole of diisopropylbenzene. The polymerization of butadiene can be performed in a solvent composed of 90 percent by weight cyclohexane and 10 percent by weight diethylether. The molar ratio of diinitiator to monomer determines the molecular weight of the polymer. The polymer is capped with two moles of ethylene oxide and terminated with two moles of methanol to produce the dihydroxy polybutadiene. Suitable polyhydroxylated polydienes include KRATON LIQUID™ POLYMERS HPVM 2200 series products and Shell Diol L-2203, which are commercially available from Shell Chemical Co.

Other suitable substantially saturated polyhydroxylated polydiene polymers preferably have at least about 90 weight percent repeat units derived from conjugated dienes. The monomers used to form the polymers include olefins having from 2 to 6 carbon atoms such as are disclosed in U.S. Pat.

Nos. 4,518,753 and 3,652,732, which are hereby incorporated by reference. Optionally the polyhydroxylated polydiene polymers can be formed from up to 50 mole percent of ethylenically unsaturated comonomers having from 2 to 10 carbon atoms and substituents including aromatics, halogens, cyanides, esters, and hydroxy esters. Examples of such polymers are hydroxyl terminated diene-based polymers including anionically polymerized dienes which are given hydroxyl groups in the chain termination step or free radically polymerized dienes such as those initiated with hydrogen peroxide. Such hydrogenated substantially saturated polyhydroxylated polydiene polymers are described in U.S. Pat. Nos. 5,115,007 and 5,221,707, which are hereby incorporated by reference. These polymers preferably have a Mn ranging from about 500 to about 20,000 and more preferably about 1,000 to about 8,000 grams per mole and have from 2 to 6 and more preferably from 2 to 4 hydroxyl end groups per molecule.

Useful hydroxyl terminated hydrogenated diene polymers include POLYTAIL polymers, such as POLYTAIL HA, POLYTAIL H and POLYTAIL H10, which are commercially available from Mitsubishi Kasei Corp. When some of these polymers are hydrogenated, they are crystalline solids such as the crystalline POLYTAIL H polymer which has a melting point of about 60° C. to about 70° C.

POLYTAIL HA polymer is a non-crystalline, linear, hydrogenated butadiene diol polymer liquid having about 10 percent 1,4-addition repeating units and about 90 percent 1,2-addition repeating units. POLYTAIL HA has about two terminal hydroxyl groups per molecule and is a viscous liquid at low molecular weights such as the peak molecular weight of 2000 as described in U.S. Pat. Nos. 4,866,120 and 4,020,125, which are hereby incorporated by reference. POLYTAIL H polymer has hydrogenated trans 1,4-, cis 1,4- and 1,2-addition repeat units and 2 or more hydroxyls per molecule.

The POLYTAIL H, HA and H10 polymers have the generalized structure:

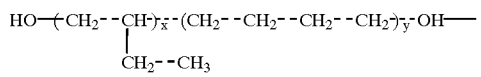

wherein X and Y are randomly distributed and the structure can contain additional —OH groups. The X/Y ratio, the —OH number per polymeric molecule, the physical state at 25° C., and the melting points of the POLYTAIL materials are as follows:

Another example of a suitable hydrogenated butadiene polymer is NISSO GI-2000 polymer produced by Nippon Soda which includes low molecular weight hydrogenated butadiene polymers which have terminal functional groups and 1,2-addition of about 84 percent.

Preferred Saturated Hydrocarbon Polymers are substantially hydrogenated polydienes which contain greater than 70 percent of 1,4-addition repeating units, and more preferably about 80 percent or more of 1,4-addition repeating units such as POLYTAIL H and POLYTAIL H10 described above. When substantially saturated polyhydroxylated polydiene polymers having hydroxy functionality and a predominant amount of hydrogenated trans 1,4-, and cis 1,4-repeat units as opposed to hydrogenated vinyl 1,2-repeat units are used, the compatibilizer can be absent from the coating composition. This is particularly the case with a substantially saturated polyhydroxylated polydiene polymer in solution with one or more organic solvents like xylene at a solids level of 1 to 15 weight percent.

Preferably, the coating composition is essentially free of monohydroxylated diene polymers, i.e., the adhesion promoting agent contains less than 25 weight percent of monohydroxylated diene polymers, preferably less than about 10 weight percent and most preferably the coating composition is free of monohydroxylated diene polymers.

In a preferred embodiment, the adhesion promoting agent is present in an amount ranging from about 0.1 to about 25 weight percent of the coating composition, preferably about 1 to about 20 weight percent, and more preferably about 5 to about 20 weight percent. In an alternative embodiment in which is compatibilizer is included in the coating composition, the amounts of the adhesion promoting agent can be higher, preferably from about 0.1 to about 45 weight percent, if desired. These percentages are based on total resin solids of the coating composition.

The adhesion promoting agent is used to promote adhesion of the crosslinkable film-forming system to a plastic substrate. In a preferred embodiment, the film-forming system comprises about 75 to about 99.9 weight percent of the coating composition on a total resin solids basis, more preferably about 80 to about 95 weight percent, and most preferably about 80 to about 90 weight percent. When the compatibilizer is present, the amount of the film-forming system in the coating composition can range from about 30 to about 99.9 weight percent, preferably about 60 to about 99.9 weight percent, and more preferably about 75 to about 99.9 weight percent.

The crosslinkable film-forming system comprises one or more crosslinkable film-forming resins and one or more

|  | Suitable Range | POLYTAIL H** | POLYTAIL HA*** | POLYTAIL H10 |
|---|---|---|---|---|
| X/Y | 0.10 to 10.0 | 2/8 | 9/1 | 2/8 |
| Mn | 500–20,000 | 2800 | 2000 | 1400 |
| OH Functionality* | 1.5–4 | 2.1 to 2.3 | 1.8 to 1.9 |  |
| Physical State | Liquid to low melting solid (MP </= 80° C.) | Waxy solid | Liquid | Soft waxy solid |

*Number of OH groups per average molecule (an average number of hydroxyl functional groups).
**POLYTAIL H has an OH value in the range of 37–53 mg/g KOH as determined by titration with KOH, a hydrogen saturation degree of at least 99% (iodine value: 3.9 g/100 g) and a number average molecular weight of about 2000.
***POLYTAIL HA has an OH value in the range of 41–55 mg/g KOH as determined by titration with KOH, has a hydrogen saturation degree of at least 99% (iodine value: 3.9 g/100 g) and a number average molecular weight of about 2000.

crosslinking materials which are capable of reacting with crosslinkable film-forming resin. As used herein, "film-forming", means that the film-forming resin(s) forms a self-supporting continuous film on at least a horizontal surface of the substrate upon curing at ambient or elevated temperature and also includes oligomeric or polymeric materials that upon removal of any solvents or carriers present in the polymer emulsion, dispersion, suspension or solution, can coalesce to form a film on at least a horizontal surface of the substrate and are capable of curing into a continuous film.

Examples of useful crosslinkable film-forming resins include oligomers and polymers such as hydroxy functional polyester oligomers or polymers, carbamate functional polyester oligomers or polymers, hydroxy functional acrylic oligomers or polymers, carbamate functional acrylic oligomers or polymers, hydroxy functional urethane oligomers or polymers, carbamate functional urethane oligomers or polymers, epoxy functional acrylic oligomers or polymers and mixtures thereof. Nonlimiting examples of suitable crosslinkable film-forming resins including acrylic polymers and copolymers such as acrylic polyol polymers and poly-acrylourethanes; polyester polymers and copolymers such as polyester urethanes and polyester polyol polymers; polyurethane polymers and copolymers such as polyetherurethanes and the like. These polymers generally have active hydrogens either in their chemical structure and/or from functional groups that can be present on the polymers, such as one or more hydroxyl, carboxyl, amido, primary and/or secondary amino, epoxy, thiol, carbamate groups and the like.

Suitable crosslinkable acrylic polymers include crosslinkable homopolymers and copolymers of acrylic acid, methacrylic acid and/or alkyl esters thereof having from 1 to 20 carbon atoms in the alkyl group which can be optionally copolymerized with one or more other polymerizable ethylenically unsaturated monomers. Suitable alkyl esters of acrylic acid or methacrylic acid include methyl methacrylate, isobutyl methacrylate, ethyl methacrylate, n-butyl methacrylate, ethyl acrylate, n-butyl acrylate, 2-ethylhexyl acrylate and 2-ethylhexyl methacrylate. Suitable copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. For crosslinkable acrylic polymers, suitable active hydrogen functional monomers can be used in addition to the other acrylic monomers mentioned above and include, for example, hydroxyethyl acrylate, hydroxyethyl methacrylate, hydroxypropyl acrylate, and hydroxypropyl methacrylate. Epoxy functional acrylics are also useful.

The acrylic polymer can be prepared by free radical initiated solution polymerization techniques in the presence of suitable free radical initiators such as organic peroxides or azo compounds, for example, benzoyl peroxide or 2,2'-azobis(2-methylbutane nitrile). The polymerization can be carried out in an organic solvent in which the monomers and resultant polymer are soluble. Suitable solvents include aromatic solvents such as xylene and toluene and ketones such as methyl amyl ketone. Alternately, the acrylic polymer can be prepared by emulsion or dispersion polymerization techniques well known to those skilled in the art.

Suitable polyester polymers include alkyds and can be prepared by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Functional equivalents of the polycarboxylic acids, such as anhydrides where they exist, or lower alkyl esters of the polycarboxylic acids, such as methyl esters, also can be used.

Where it is desired to produce air-drying alkyd resins from the polyester polymer, suitable drying oil fatty acids, such as those derived from linseed oil, soya bean oil, tall oil, dehydrated castor oil or tung oil, can be used to modify the polyester by methods well known to those skilled in the art. The polyester generally contains a portion of free hydroxyl and/or carboxyl groups which are available for crosslinking reaction with a crosslinking agent. Suitable crosslinking agents include amine or amide-aldehyde condensates or polyisocyanate curing agents as mentioned below.

Polyurethanes can also be used as the crosslinkable film-forming resin in the coating composition of the present invention. Suitable polyurethanes include polymeric polyols which are prepared by reacting polyester polyols or acrylic polyols such as those mentioned above with a polyisocyanate in an OH/NCO equivalent ratio of greater than 1:1 so that free hydroxyl groups are present in the product. Suitable organic polyisocyanates which can be used to prepare the polyurethane polyol include aliphatic or aromatic polyisocyanates or mixtures thereof. Diisocyanates are preferred, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates, such as isophorone diisocyanate and 4,4'-methylene-bis(cyclohexyl isocyanate) can be used. Examples of suitable higher polyisocyanates include 1,2,4-benzene triisocyanate and polymethylene polyphenyl isocyanate.

The film-forming resin generally comprises about 10 to about 85 weight percent based upon total resin solids of the coating composition, and preferably about 20 to about 75 weight percent.

The crosslinkable film-forming system also comprises one or more crosslinking materials, such as aminoplasts, polyacids, anhydrides, isocyanates and mixtures thereof. The amount of crosslinking material in the system generally ranges from about 15 to about 50 weight percent based upon total resin solids of the coating composition, and preferably ranges from about 25 to about 45 weight percent.

The crosslinking material or mixture of crosslinking materials used in the coating composition is dependent upon the crosslinkable film-forming resin present in the coating composition. Typically, crosslinking is performed through functional group chemistry such as by addition or condensation reaction chemistry as opposed to thermally-initiated free radical reaction chemistry. Crosslinking by addition reaction can occur through reactants for Michaels addition reaction such as amines adding across unsaturated bonds of the crosslinking material.

When amide or carbamate functional resins are present, aminoplast crosslinking materials are preferred. With hydroxy or epoxy functional resins, aminoplast, isocyanate functional or anhydride functional crosslinking agents are preferred. With acid functional resins, aminoplast or epoxy functional crosslinking materials are preferred. Additionally, acid or amine functional crosslinking materials can be used with epoxy functional resins. Isocyanate crosslinkers, including mono-, di-, and polyisocyanates can be used in conjunction with any of the active hydrogen containing or epoxy functional film-forming resins suitable for use in the claimed coating composition.

In a preferred embodiment, the crosslinking material is selected from aminoplasts, polyacids, anhydrides and mixtures thereof. Aminoplast crosslinking materials are suitable for use with most crosslinkable film-forming resins and are preferably present as the predominant crosslinking material in the coating composition. Suitable aminoplasts are made by reaction of materials bearing NH groups, such as urea, melamine, benzoguanamine, glycouril and cyclic ureas, with carbonyl compounds such as formaldehyde or higher aldehyde and ketones, and alcohols such as methanol ethanol, butanol propanol and hexanol. Condensation products obtained from the reaction of alcohols and formaldehyde with melamine, urea or benzoguanamine are most common and preferred herein. However, condensation products of other amines and amides can also be used, for example, aldehyde condensates of triazines, diazines, triazoles, guanadines, guanamines and alkyl- and aryl-substituted melamines. Some examples of such compounds are N,N'-dimethyl urea, benzourea, dicyandiamide, formaguanamine, acetoguanamine, glycoluril, 2-chloro-4,6-diamino-1,3,5-triazine, and the like.

The aminoplast crosslinking agent can be alkylated, for example, suitable aminoplast crosslinking agents include methylated and/or butylated or isobutylated melamine formaldehyde resins which are substantially monomeric or polymeric with a degree of polymerization ranging from about 1.2 to about 3.

The aminoplast resins can contain methylol or similar alkylol groups, and in most instances, at least a portion of these alkylol groups are etherified by reaction with an alcohol to provide organic solvent soluble resins. Any monohydric alcohol can be used to etherify the alkylol groups, including methanol, ethanol, propanol, butanol, pentanol, hexanol and heptanol, as well as benzyl alcohol and other aromatic alcohols, cyclic alcohols such as cyclohexanol, monoethers of glycols such as methoxypropanol and methoxyethoxyethanol, and halogen substituted or other substituted alcohols, such as 3-chloropropanol or butoxyethanol. Usually, the preferred etherification is methylolation with formaldehyde with the addition of weak bases. Preferably, 3 to 6 methanol groups per molecule of melamine are reacted. Melamine formaldehyde resins with a mixture of etherification can also be used. Generally, these can range from mostly methylated groups with a minor amount of butylated groups to a substantial amount of butylated groups with a minor amount of methylated groups. Such crosslinking agents typically have a number average molecular weight of about 300 to about 600. Suitable aminoplast resins are commercially available from Cytec Industries Inc. under the trademark CYMEL and from Monsanto Chemical Co. under the trademark RESIMENE.

Polyacid crosslinking materials suitable for use in the present invention on average generally contain greater than one acid group per molecule, more preferably three or more and most preferably four or more, such acid groups being reactive with epoxy functional film-forming polymers. Preferred polyacid crosslinking materials have di-, tri- or higher functionalities. Suitable polyacid crosslinking materials which can be used include carboxylic acid group-containing oligomers, polymers and compounds, such as acrylic polymers, polyesters, and polyurethanes and compounds having phosphorus-based acid groups.

Examples of suitable polyacid crosslinking materials include ester group-containing oligomers and compounds including half-esters formed from reacting polyols and cyclic 1,2-acid anhydrides or acid functional polyesters derived from polyols and polyacids or anhydrides. These half-esters are of relatively low molecular weight and are quite reactive with epoxy functionality. Suitable ester group-containing oligomers are described in U.S. Pat. No. 4,764,430, column 4, line 26 to column 5, line 68, which is hereby incorporated by reference.

Other useful crosslinking materials include acid-functional acrylic crosslinkers made by copolymerizing methacrylic acid and/or acrylic acid monomers with other ethylenically unsaturated copolymerizable monomers as the polyacid crosslinking material. Alternatively, acid-functional acrylics can be prepared from hydroxy-functional acrylics reacted with cyclic anhydrides.

In an alternative embodiment in which the coating composition is essentially free of monohydroxylated diene polymers, one or more isocyanate-containing crosslinking materials can be used to crosslink the hydroxy functional film-forming resins. The equivalent ratio of isocyanate-functional groups of the isocyanate-containing crosslinking material to polar groups of components of the film-forming system, such as the film-forming resin and/or adhesion promoting agent, is greater than 0.8:1, preferably greater than 0.9:1, and more preferably greater than 1.1:1. Most preferably, the equivalent ratio is 1:1 to facilitate crosslinking.

Useful isocyanate-containing materials include aliphatic, cycloaliphatic or aromatic di- or polyisocyanates, or mixtures thereof. Higher polyisocyanates are preferred, such as triisocyanates which can be used alone or in combination with diisocyanates. Examples of suitable aliphatic diisocyanates include trimethylene, tetramethylene, tetramethylxylylene, pentamethylene, hexamethylene, 1,2-propylene, 1,2-butylene, 2,3-butylene, and 1,3-butylene diisocyanates. Also suitable are cycloalkylene diisocyanates such as 1,3-cyclopentane and isophorone diisocyanates; aromatic diisocyanates such as m-phenylene, p-phenylene and diphenylmethane-4,4-diisocyanate; aliphatic-aromatic diisocyanates such as 2,4- or 2,6-tolulene diisocyanates and 1,4-xylylene diisocyanate; nuclear-substituted aromatic diisocyanates such as dianisidine diisocyanate and 4,4-diphenylether diisocyanate; triisocyanates such as triphenylmethane-4,4,4-triisocyanate, and 1,3,5-triisocyanato-benzene; tetraisocyanates such as 4,4-dimethyldiphenyl-methane-2,2,5,5-tetraisocyanate; polymerized polyisocyanates such as hexamethylene diisocyanate trimers, isophorone diisocyanate trimers, toluene diisocyanate dimers and trimers; and the like. Isothiocyanates corresponding to the above-described isocyanates, where they exist, can be employed as well as mixtures of materials containing both isocyanate and isothiocyanate groups. Suitable isocyanates are commercially available from Bayer USA, Inc. under the trademarks MONDUR and DESMODUR.

In an alternative preferred embodiment, the coating composition of the present invention can further comprise one or more compatibilizers to assist in overcoming incompatibility between the Saturated Hydrocarbon Polymer and the other components of the coating composition, such as when a polydiene Saturated Hydrocarbon Polymer contains less than 70 weight percent of 1,4-addition repeating units.

When present, the amount of compatibilizer, as a distinct component in the coating composition separate from the Saturated Hydrocarbon Polymer, crosslinkable film-forming resin and crosslinker material, can range from about 0.01 to about 60 weight percent, preferably from 3 to 50 weight percent, more preferably from 5 to 30 weight percent, and most preferably from 7 to 25 weight percent based on total resin solids of the coating composition.

Suitable compatibilizers include hydrocarbon alcohols containing at least 12 or more contiguous carbon atoms uninterrupted by heteroatoms such as oxygen. The upper limit on the number of carbon atoms is that number that would result in solid compatibilizer settling out in the coating composition under the conditions of application to substrates. Preferably the number of carbon atoms is from 12 to 400 and more preferably from 12 to 36.

Examples of useful fatty alcohols are those that can be made by reacting a monocarboxylic acid such as stearic acid, isostearic acid, lauric acid, hexadecanoic acid, tetradecanoic acid, and tridecanoic acid with an epoxide such as ethylene oxide, propylene oxide, glycidol and glycidyl neodecanoate (CARDURA E). Esters and ethers of hydrocarbon alcohols containing 12 or more contiguous carbon atoms are also suitable compatibilizers for use in the present invention.

Alternatively, the compatibilizer can be a resinous material such as polyether, polyurethane, polyester polyurethane, polyether polyurethane, acrylic, polyester and polyether containing at least one hydrocarbon chain and hydroxy functionality. The hydrocarbon chain can be pendant to a repeating unit chain of the resinous material or internal as part of the repeating unit chain of the resinous material or both. The hydrocarbon chain contains eight or more contiguous carbon atoms, can be linear or branched and can have substantially saturated carbon units of secondary or tertiary carbons or, where appropriate, primary carbons such as

methylenes or carbenes like

and —CH$_3$, uninterrupted by heteroatoms such as oxygen and nitrogen. The compatibilizer can have from 5 to 40 percent, preferably from 10 to 30 percent, more preferably from 16 to 25 percent oxygen and nitrogen atoms per molecule. These percentages are based on the total weight of all of the atoms, except hydrogen, in the molecule. The hydroxy or hydroxyl functionality can be terminal and/or pendant to the backbone chain of the resinous material.

The resinous material can be formed by reacting a diol, triol or polyol with an anhydride and an epoxy. Suitable diols, triols and polyols include but are not limited to 2,2,4-trimethyl-1,3-pentanediol; 2-butyl-2-ethyl-1,3-propane diol; trimethylol propane; di-trimethylol propane; pentaerythritol; and sorbitol. Suitable anhydrides include but are not limited to phthalic anhydride, maleic anhydride, hexahydrophthalic anhydride, and alkyl hexahydrophthalic anhydrides such as methylhexahydrophthalic anhydride. Suitable epoxies include but are not limited to glycidyl neodecanoate (CARDURA E), 1,2-epoxy dodecane, t-butylphenyl glycidyl ether, nonylphenyl glycidyl ether, 1,2-epoxyoctane, glycidyl isostearate, and glycidyl octoate.

Other useful anhydrides include alkyl succinic anhydride such as dodecyl succinic anhydride, octadecylsuccinic anhydride, and the like and alkenyl succinic anhydride such as decenyl succinic anhydride, octadecenyl succinic anhydride and the like. When these succinic anhydrides are used, suitable epoxides include lower molecular weight epoxides such as ethylene oxide; propylene oxide; n-butylglycidyl ether; 1,2-hexane oxide; 2,3-hexane oxide; and glycidol in addition to those mentioned above.

Also, the resinous material can be formed by reacting a multi-functional epoxide, preferably a di-epoxide, with a monocarboxylic acid such as those described above. Suitable multi-functional epoxides include ERL 4221 and ERL 4229, commercially available from Union Carbide Corporation, EPON 828 and EPON 1001, commercially available from Shell Chemical Company; 1,4-butanediol diglycidyl ether, cyclohexane diglycidyl ether, resorcinol diglycidyl ether, and novolac glycidyl ethers. In addition, acrylic epoxides and acrylic glycidol esters can be reacted with a mono-carboxylic acid to form the resinous material used as the compatibilizer in the present invention, for example, a glycidyl methacrylate/methylmethacrylate copolymer reacted with isostearic acid. Also, the resinous material can be prepared from a diisocyanate or polyisocyanate such as IPDI (isophorone diisocyanate) reacted with glycidol which is further reacted with isostearic acid. Another example is the reaction product of monoepoxides, such as CARDURA E, with acid functional acrylic polymers prepared by any method known to those skilled in the art.

It should be noted that optionally the crosslinkable film-forming resin described above can be omitted from the coating composition when the compatibilizer is a resinous material which is capable of crosslinking. In this situation, the resinous material compatibilizer has at least two unreacted functional groups such as hydroxyl groups ("OH"). Also the amount of such a compatibilizer is usually in the upper portion of the above-stated range of amounts for the compatibilizer.

The coating composition of the present invention can also contain one or more pigments to give it color. Compositions containing metallic flake pigmentation are especially useful for the production of so-called "glamour metallic" finishes, chiefly upon the surface of automobile bodies and parts. Proper orientation of the metallic pigment results in a lustrous shiny appearance with excellent flop, distinctness of image and high gloss. Suitable metallic pigments include aluminum flakes, bronze flakes, coated mica, nickel flakes, tin flakes, silver flakes, copper flakes, or combinations thereof.

The coating compositions of the present invention also can contain non-metallic color pigments conventionally used in coating compositions, including inorganic pigments, such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments. In general, the total amount of pigment in the coating composition ranges from about 1 to about 80 percent by weight based on weight of the resin solids of the composition. The metallic pigment is preferably used in amounts of 0.5 to 25 percent by weight of the aforesaid aggregate weight. The specific pigment to binder ratio can vary widely so long as it provides the requisite hiding at desired film thickness and application solids.

If desired, the coating composition of the present invention can contain other materials well known in the art of formulating surface coatings, such as surfactants, flow control agents, thixotropic agents, fillers, anti-gassing agents, organic co-solvents, additional film-forming polymers, polymeric microparticles, catalysts and other conventional additives. Nonexclusive examples of useful solvents included in the composition, in addition to any provided by other coating components, include aliphatic solvents such as hexane, Neptune, naphtha, and mineral spirits; aromatic and/or alkylated aromatic solvents such as toluene, xylene, and SOLVESSO 100; alcohols such as ethyl, methyl, n-propel, isopropyl, n-butyl, isobutyl and amyl alcohol, and m-pyrol; esters such as ethyl acetate, n-butyl acetate, isobutyl acetate, isobutyl isobutyrate, and oxohexyl acetate; ketones such as acetone, methyl ethyl ketone, methyl isobutyl ketone, diisobutyl ketone, methyl n-amyl ketone, and isophorone. Additional solvents include glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate. These other materials can constitute up to 40 percent by weight of the total weight of the resin solids of the coating composition.

The coating composition of the present invention can be made using techniques well known to those skilled in the art. Generally, the following ingredients are mixed together in any order that permits sufficient compatibilization of the ingredients under agitation at ambient conditions: Saturated Hydrocarbon Polymer, film-forming resin, crosslinking material, compatibilizer (if present), and any solvent, pigment and/or other additives used in the art of formulated surface coatings.

The percent by weight solids content of the coating composition can vary from 20 to 100 percent. Preferably, the percent by weight of solids is 30 to 70 percent. The coating composition can be present in the form of a liquid or powder. When the coating composition is present as a liquid, viscosity of the coating composition can range from 12 to 40 seconds, preferably from 15 to 35 seconds as measured using a #4 Ford Cup.

The coating composition of the present invention can be made as a solvent-borne, water-borne or powder composition using techniques well known to those skilled in the art for making such compositions. For example, for water-borne coating or aqueous-based compositions, the Saturated Hydrocarbon Polymer can be dispersed in water by any technique known in the art. One technique described in European Patent Application No. 601,665 includes heating the polydiene polymer until its viscosity is less than 3000 centipoise, adding a mixture of water and surfactant under high speed agitation, cooling the dispersion and then optionally subjecting the dispersion to turbulent flow and/or cavitation in an apparatus such as a MICROFLUIDIZER available from Microfluidics Corporation, Newton, Mass. As an alternative to microfluidization, the components can be added in a manner and order under agitation in a suitable container to obtain the proper oil-in-water inversion. Often, use of additional solvent(s) such as coalescing solvents are used to prepare water-borne coatings. Examples of useful coalescing solvents include: propylene carbonate, glycols including ethylene glycol, diethylene glycol, propylene glycol, polypropylene glycol, and 2,2,4-trimethyl pentane-1,3-diol, glycol ether alcohols including ethylene glycol butyl ether, diethylene glycol butyl ether, ethylene glycol hexyl ether, propylene glycol methyl ether, propylene glycol propyl ether, and propylene glycol phenyl ether, lower alcohols including isopropanol, butanol, p-amyl alcohol, and tridecyl alcohol, and the like. Ethylene glycol hexyl ether is preferred. The coalescing solvent can be present in amounts ranging from about 5 to about 40 percent by weight, and preferably 15 to 30 percent by weight based on total solids weight of the aqueous dispersion. Suitable powder composition forming techniques are disclosed in U.S. Pat. No. 5,214,101, column 8, lines 9–18, which is hereby incorporated by reference.

The coating compositions of the present invention are useful as coating compositions for various thermoplastic and thermosetting plastic substrates, for example, thermoplastic olefins including polyethylene and polypropylene substrates; reaction injected molding urethane (RIM) substrates; EPDM rubber substrates; and their blends. The coating composition can be applied to at least a portion of the surface of the substrate by conventional means including brushing, dipping, flow coating, spraying and the like but is most often applied by spraying. Conventionally known techniques and equipment for manual or automatic spraying and electrostatic spraying can be used. Although conventional application means are employed, the coating composition is deposited directly onto the surface of the plastic substrate without the need of an adhesion promoter, tie coat layer or corona pretreatment.

During application of the coating composition to the plastic substrate, a film of the coating composition is formed on the substrate. Typically, the film thickness ranges from about 0.01 to about 5.0 mils (about 0.254 to about 127 µm), preferably 0.08 to 3.0 mils (5.1 to 76.2 µm). When the coating composition is used as a primer, preferably the dry film thickness is about 0.08 to about 3.0 mils (about 5.1 to about 76.2 µm) and most preferably from 0.08 to 2.0 mils (5.1 to 50.8 µm). When used as a basecoat or topcoat including clear topcoat, preferably the dry film thickness is about 0.2 to about 3.0 mils (about 5.1 to about 76.2 µm).

After the application of the coating material to the plastic or other substrate, the coated substrate is heated to cure the coating material or cure the coating layers of a basecoat-clearcoat system. In some instances, simply air drying the coating composition will be sufficient. In the curing process, organic solvents and/or water are driven out of the deposited film and the film-forming materials of the coating composition are crosslinked with the aid of the crosslinking resins present. The heating or curing operation is usually carried out at a temperature that is below the melting point of the plastic substrate to which the coating composition has been applied, generally of about 160° F. to about 350° F. (about 71° C. to about 177° C.), and preferably from 235° F. to 275° F. (113° C. to 132° C.).

When the coating composition is used as a primer, subsequent topcoats such as conventional basecoat-clearcoat composites or conventional monocoat topcoats can be applied to the primer film. Optionally, when the coating composition is used as a basecoat, a subsequent conventional clearcoat can be applied to the dried or cured basecoat film. Usually when the coating composition of the present invention is used as a basecoat, the deposited basecoat film is flashed at ambient conditions for about 1 to about 5 minutes before the clearcoat is applied "wet on wet", then the basecoat-clearcoat composite is cured as detailed above.

The present invention will now be illustrated by the following specific, non-limiting examples. All parts and percentages are by weight unless otherwise indicated.

The following Example 1 shows the preparation of various pigmented film-forming compositions.

EXAMPLE 1

For each of the liquid coatings of Example 1 (Samples 1–8), the components in the amounts listed in Table 1 were added sequentially to a one pint container under agitation. After all of the components were added, agitation was continued for about one minute. Samples 1–7 were prepared in accordance with the present invention. Sample 8 is a comparative example which contains no Saturated Hydrocarbon Polymer.

TABLE 1

| | Weight of component (grams) Sample No. | | | | | | | |
|---|---|---|---|---|---|---|---|---|
| COMPONENT | 1 | 2 | 3 | 4 | 5 | 6 | 7 | 8 comparative |
| VM&P Naphtha | 17.0 | 17.0 | 17.0 | 18.0 | 18.8 | 16.0 | 24.0 | 17.0 |
| MICROGEL A[1] | 22.4 | 32.8 | 32.8 | 32.8 | 32.8 | 32.8 | 32.8 | 32.8 |
| TINUVIN 328[2] | 8.0 | 8.0 | 8.0 | 8.0 | 8.0 | 8.0 | 8.0 | 8.0 |
| POLYTAIL H Saturated Hydrocarbon Polymer solution[3] | 170.2 | 0.0 | 0.0 | 0.0 | 0.0 | 0.0 | 0.0 | 0.0 |
| Polytail HA[4] Saturated Hydrocarbon Polymer | 0.0 | 0.0 | 0.0 | 0.0 | 0.0 | 18.0 | 0.0 | 0.0 |
| Polytail H10[5] Saturated Hydrocarbon Polymer solution | 0.0 | 0.0 | 0.0 | 0.0 | 0.0 | 0.0 | 18.0 | 0.0 |
| Shell Diol L-2203[6] Saturated Hydrocarbon Polymer | 0.0 | 18.0 | 18.0 | 36.0 | 36.0 | 0.0 | 0.0 | 0.0 |
| Compatibilizer A[7] | 0.0 | 0.0 | 21.6 | 0.0 | 31.6 | 0.0 | 0.0 | 0.0 |
| crosslinking material[8] | 51.2 | 94.0 | 94.0 | 94.0 | 94.0 | 94.0 | 94.0 | 94.0 |
| Pigment Paste A[9] | 76.0 | 76.0 | 76.0 | 76.0 | 76.0 | 76.0 | 76.0 | 76.0 |
| Polyester A[10] | 21.8 | 21.8 | 12.6 | 13.6 | 0.0 | 21.8 | 21.8 | 30.0 |
| Polyester B[11] | 30.6 | 30.6 | 17.8 | 18.8 | 0.0 | 30.6 | 30.6 | 42.2 |
| DDBSA Catalyst[12] | 2.8 | 2.8 | 2.8 | 2.8 | 2.8 | 2.8 | 2.8 | 2.8 |
| $M_n$ (gm/mole) of Saturated Hydrocarbon Polymer | 2,800 | 2,800 | 2,800 | 2,800 | 2,800 | 2,800 | 1,400 | none |
| Ratio of 1,4/1,2 butadiene in Saturated Hydrocarbon Polymer | 80/20 | 50/50 | 50/50 | 50/50 | 50/50 | 10/90 | 80/20 | none |

[1]MICROGEL A polymeric microparticle dispersion prepared according to U.S. Pat. No. 4,147,688.
[2]TINUVIN 328 U.V. absorber which is commercially available from Ciba-Geigy Corp.
[3]POLYTAIL H Solution consists of a blend of the following materials: 27.6% resin solids POLYTAIL H Saturated Hydrocarbon Polymer which is commercially available from Mitsubishi Chemicals; 65.5% resin solids CYMEL 1156 alkylated melamine-formaldehyde resin which is commercially available from Cytec, Inc.; and 6.9% resin solids MICROGEL A, prepared at 40% total solids in Xylene and heated approximately 3 hours at a temperature range between 120° F. and 150° F. until all materials became miscible, then allowed to cool to room temperature.
[4]POLYTAIL HA Saturated Hydrocarbon Polymer which is commercially available from Mitsubishi Chemicals.
[5]POLYTAIL H10 Saturated Hydrocarbon Polymer which is commercially available from Mitsubishi Chemicals. A 20% solution of POLYTAIL H10 in xylene was used.
[6]Shell Diol L-2203 Saturated Hydrocarbon Polymer which is commercially available from Mitsubishi Chemicals.
[7]COMPATIBILIZER A, an oligomer having an acid value of 5.19, and an epoxy equivalent weight of 9471 was prepared from the following materials: 1472.80 g isostearic acid; 767.20 g ERL-4221, a cyclo aliphatic epoxide which is commercially available from Union Carbide; and 4.26 g triphenylphosphine.
[8]Cymel 1156 crosslinking material is an alkylated melamine-formaldehyde resin which is commercially available from Cytec, Inc.
[9]PIGMENT PASTE A: black pigment dispersion was prepared from the following materials: 14.5 g of n-butyl acetate; 0.8 g of Suspeno #202-X dispersing agent which is commercially available from Poly-Resyn; 31.6 g of Monarch 1300 Carbon Black which is commercially available from Cabot Corp. 144.1 g of acrylic resin prepared from:
52% Solids

| Weight Percent Solids | 48% Solvent |
|---|---|
| 29.9% styrene | 65.7% VM + P Naphtha |
| 19.9% 2-ethyl hexyl acrylate | 21.9% isobutanol |
| 19.4% butyl methacrylate | 11.5% toluene |
| 17.9% methyl methacrylate | |
| 10.0% hydroxy ethyl acrylate | |
| 1.9% methacrylic acid | |
| 0.6% acrylic acid | |
| 0.4% propylene imine | |

[10]POLYESTER A having a total weight solids of 90% in xylene and an acid value of 7.93 was prepared from the following materials:
2.0 moles of hexahydrophthalic anhydride
1.0 mole of neopentyl glycol
0.1% based upon resin solids of triphenyl phosphite

TABLE 1-continued 0.01% based upon resin solids of butyl stannoic acid
[11]POLYESTER B having a total weight solids of 88.5% and an acid value of 8.14 was prepared from the following materials:
136.4 kg (300.7 lb) 1,6 hexanediol
83.1 kg (183.1 lb) hexahydrophthalic anyhydride
52.5 kg (115.8 lb) adipic acid
27.2 g butyl stannoic acid
139.9 g triphenyl phosphate
28.2 kg (62.2 lb) methyl isobutyl ketone
[12]DDBSA catalyst was a solution of dodecylbenzene sulfonic acid at 70% solids in isobutanol.

Application and Testing of Samples 1–8

Each of the pigmented coating Samples 1–8 were spray applied to individual test panels of various types of thermoplastic polyolefin (TPO) panels[1] (described below) using a Spraymation application machine. Each coating sample was applied directly to the surface of the TPO without the aid of any adhesion promoting layer or oxidizing pretreatment such as flame treatment. Two coats of each coating sample were applied with a 60 second ambient flash between each coat.

[1]Test panels were obtained from Standard Plaque, Inc.

After the application of the second coating of sample, an additional ambient flash of 90 seconds was allowed prior to application of UCC-1001TA clearcoat which is commercially available from PPG Industries, Inc. Two coats of the clearcoat were applied with a 60-second ambient flash between each coat. After the application of the second coat of clearcoat, an additional ambient flash of 10 minutes was allowed prior to baking of the wet-on-wet coated composite for 35 minutes at the respective bake temperatures specified below.

Gloss of test panels coated as described above was determined at a 20° angle using a Micro-TriGloss Reflectometer available from BYK Gardner, Inc. The distinctness of image ("DOI") of sample panels was determined using a Dorigon II DOI Meter which is commercially available from Hunter Lab. For both of these tests, a higher value indicates better coating appearance on the test panel.

Sample panels were tested for initial adhesion and adhesion after exposure to about 380° C. (100° F.) temperature and 100% relative humidity for 10 days. To evaluate initial adhesion, testing was conducted on an area within about 12.7 mm (0.5 inches) of the injection gate area of the molded panel. The injection area typically represents the most severe test area for adhesion. To evaluate adhesion after humidity/elevated temperature exposure, testing was performed on an area at least 50.8 mm (2 inches) from the injection gate area of the molded panel. Since the adhesion tests were conducted in different areas of the test panels, relative differences between initial adhesion and humidity adhesion should not be compared.

The testing for both initial and humidity/temperature adhesion test panels was performed by scoring each test panel with a cross-hatch using a razor blade by making a first set of 6 parallel cuts (each spaced about 2 mm from an adjacent cut) in one direction and a second set of 6 parallel cuts (each spaced about 1 mm from an adjacent cut) perpendicular to and intersecting each of the cuts of the first set.

Adhesion of the coating to the panel was determined using LP-24 Nichiban Tape (commercially available from Niche-Ban, Japan) according to ASTM D3359. The tape was applied to the cross-hatched area using moderate thumb pressure. The tape was lifted from the surface of the cross-hatched area by holding one end of the tape in place using an index finger and quickly lifting and pulling the other end of the tape from the surface. A total of four tape pulls in four different directions parallel to the razor cuts were conducted on the cross-hatched areas of the coated test panels. The rating scale used for determining the degree of adhesion according to ASTM D3359 ranged from zero which indicated no adhesion to 5 which indicated perfect adhesion. The results are reported as a series of four numbers, where each number indicates the rating for one of the four tape pulls. For example, an adhesion test rating of "5,5,4,3" represent a first tape pull rating of 5, a second tape pull rating of 5, a third tape pull rating of 4, and a fourth tape pull rating of 3.

Each individual coated and cured test panel also was tested for fuel soak resistance by submerging individual 10.16 centimeter (cm) by 2.54 cm (4 inch by 1 inch) panels with a 2.54 cm by 2.54 cm (1 inch by 1 inch) x-scribe in a solution of toluene/naphtha/ethanol (95/95/10 parts by volume) and observing the delamination over a 60 minute period. The time stated in the fuel soak results represents the time necessary for approximately 35% delamination of the respective coating from the substrate.

The results of the above tests of panels coated with Samples 1–8 described above are reported in Tables 2A–4B below. The thickness (mils) of each coating layer (basecoat (BC), clearcoat (CC) and adhesion promoter (AP)) are also shown in the Tables below.

TABLE 2A

Panels: SEQUEL 1440 TPO    Baking Conditions: 35 minutes at 110° C. (230° F.)

| SAMPLE | 20° Gloss | DOI | Initial Adhesion | 10 Day Humidity | 60 min. Fuel | Film Thickness (mils) | | |
|---|---|---|---|---|---|---|---|---|
| | | | | | | BC | CC | AP |
| 1 | 83.0 | 91.0 | 3, 2, 2, 1 | 2, 2, 1, 1 | 60+ | 0.88 | 1.62 | 0.00 |
| 2 | 85.2 | 90.0 | 2, 0, 0, 0 | 0, 0, 0, 0 | 60+ | 0.77 | 1.64 | 0.00 |

TABLE 2A-continued

| Panels: SEQUEL 1440 TPO | | | Baking Conditions: 35 minutes at 110° C. (230° F.) | | | | | |
|---|---|---|---|---|---|---|---|---|
| | | | Initial | 10 Day | 60 min. | Film Thickness (mils) | | |
| SAMPLE | 20° Gloss | DOI | Adhesion | Humidity | Fuel | BC | CC | AP |
| 3 | 83.7 | 95.0 | 2, 0, 0, 0 | 0, 0, 0, 0 | 60+ | 0.77 | 1.66 | 0.00 |
| 4 | 84.5 | 94.0 | 0, 0, 0, 0 | 0, 0, 0, 0 | 60+ | 0.66 | 1.30 | 0.00 |
| 5 | 26.2 | 5.0 | 2, 0, 0, 0 | 2, 1, 0, 0 | 55 | 0.87 | 1.59 | 0.00 |
| 6 | 80.0 | 82.0 | 0, 0, 0, 0 | 0, 0, 0, 0 | 30 | 0.77 | 1.56 | 0.00 |
| 7 | 85.0 | 98.0 | 1, 0, 0, 0 | 3, 1, 0, 0 | 60+ | 0.69 | 1.64 | 0.00 |
| 8 (comparative) | 85.7 | 90.0 | 0, 0, 0, 0 | 0, 0, 0, 0 | 0 | 1.10 | 1.74 | 0.00 |
| MPP4100[13] coated with Sample 8 (comparative) | 81.0 | 94.0 | 4, 3, 3, 3 | 5, 5, 5, 5 | 10 | 0.48 | 1.35 | 0.16 |

[13]MPP4100 is a commercially available chlorinated polyolefin based adhesion promoter available from PPG Industries, Inc.

As shown in Table 2A, for Sequel 1440 TPO panels baked at a temperature of 110° C. (230° F.), all of the Saturated Hydrocarbon Polymer-containing coatings (Samples 1–7) had much better fuel soak resistance than the comparative coating Sample 8, even when a commercial chlorinated polyolefin adhesion promoter was used as a pretreatment. The adhesive properties of the Saturated Hydrocarbon Polymer-containing coatings (Samples 1–7) were generally worse than those of the commercial adhesion promoter coated with Sample 8. The coating including the higher Mw Saturated Hydrocarbon Polymer having 1,4:1,2 butadiene content (80:20) (Sample 1) had the best adhesion of all the Saturated Hydrocarbon Polymers applied to this substrate under these conditions. Similar trends in adhesion testing fuel soak resistance results were observed when the coatings of Samples 1–8 were applied to ETA-3183 TPO panels.

TABLE 2B

| Panels: D161B TPO | | | Baking Conditions: 35 minutes at 110° C. (230° F.) | | | | | |
|---|---|---|---|---|---|---|---|---|
| | | | Initial | 10 Day | 60 min. | Film Thickness (mils) | | |
| SAMPLE | 20° Gloss | DOI | Adhesion | Humidity | Fuel | BC | CC | AP |
| 1 | 85.6 | 93.0 | 5, 5, 5, 5 | 5, 5, 5, 5 | 60+ | 0.88 | 1.62 | 0.00 |
| 2 | 85.6 | 94.0 | 5, 5, 5, 5 | 1, 0, 0, 0 | 60+ | 0.77 | 1.64 | 0.00 |
| 3 | 85.4 | 95.0 | 5, 5, 5, 5 | 3, 1, 0, 0 | 60+ | 0.77 | 1.66 | 0.00 |
| 4 | 85.7 | 93.0 | 5, 5, 5, 5 | 5, 5, 4, 4 | 60+ | 0.66 | 1.30 | 0.00 |
| 5 | 23.3 | 10.0 | 5, 5, 5, 5 | 3, 2, 2, 2 | 30 | 0.87 | 1.59 | 0.00 |
| 6 | 84.6 | 88.0 | 1, 0, 0, 0 | 0, 0, 0, 0 | 20 | 0.77 | 1.56 | 0.00 |
| 7 | 85.0 | 95.0 | 5, 5, 5, 5 | 4, 1, 0, 0 | 60+ | 0.69 | 1.64 | 0.00 |
| 8 (comparative) | 84.1 | 93.0 | 0, 0, 0, 0 | 0, 0, 0, 0 | 0 | 1.10 | 1.74 | 0.00 |
| MPP4100 coated with Sample 8 (comparative) | 84.0 | 95.0 | 5, 5, 5, 5 | 5, 5, 5, 5 | 10 | 0.48 | 1.35 | 0.16 |

As shown in Table 2B, for D161B TPO panels baked at a temperature of 110° C. (230° F.), all of the Saturated Hydrocarbon Polymer-containing coatings (Samples 1–7) had much better fuel soak resistance and adhesive properties than the comparative coating Sample 8, with the exception of Sample 6 which contained the Saturated Hydrocarbon Polymer having the lowest 1,4:1,2 butadiene content (10:90). The coating including the higher Mw Saturated Hydrocarbon Polymer having 1,4:1,2 butadiene content (80:20) (Sample 1) had the best combined adhesion and fuel resistance results of all of the Saturated Hydrocarbon Polymer-containing coatings applied to this substrate under these conditions. Similar trends in adhesion testing fuel soak resistance results were observed when the coatings of Samples 1–8 were applied to TPO-880 panels.

TABLE 3A

Panels: Sequel 1440 TPO    Baking Conditions: 35 minutes at 121° C. (250° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 88.0 | 90.0 | 5, 5, 5, 5 | 5, 5, 5, 5 | 60+ | 0.87 | 1.80 | 0.00 |
| 2 | 86.8 | 92.0 | 3, 3, 3, 3 | 3, 1, 0, 0 | 60+ | 0.88 | 1.81 | 0.00 |
| 3 | 88.0 | 94.0 | 5, 5, 5, 5 | 4, 4, 2, 2 | 60+ | 0.84 | 1.85 | 0.00 |
| 4 | 86.6 | 95.0 | 5, 5, 4, 4 | 5, 5, 3, 2 | 60+ | 0.57 | 1.50 | 0.00 |
| 5 | 22.2 | 5.0 | 5, 5, 5, 5 | 4, 3, 1, 1 | 60+ | 1.15 | 1.88 | 0.00 |
| 6 | 87.0 | 90.0 | 0, 0, 0, 0 | 0, 0, 0, 0 | 60+ | 0.95 | 1.72 | 0.00 |
| 7 | 86.0 | 97.0 | 5, 5, 5, 5 | 5, 5, 5, 5 | 60+ | 0.72 | 1.88 | 0.00 |
| 8 (comparative) | 86.9 | 97.0 | 0, 0, 0, 0 | 0, 0, 0, 0 | 0 | 1.15 | 1.90 | 0.00 |
| MPP4100 coated with Sample 8 (comparative) | 86.4 | 90.0 | 5, 5, 5, 5 | 5, 5, 5, 5 | 10 | 0.82 | 1.48 | 0.15 |

As shown in Table 3A, for Sequel 1440 TPO panels baked at a temperature of 121° C. (250° F.), all of the Saturated Hydrocarbon Polymer-containing coatings (Samples 1–7) exhibited better adhesive properties than the comparative Sample 8 coating (without chlorinated polyolefin pretreatment), with the exception of Example 6 which contained the Saturated Hydrocarbon Polymer with the lowest 1,4:1,2 butadiene content (1:9). Again, all coatings (Samples 1–7) containing Saturated Hydrocarbon Polymers according to the present invention had much better fuel soak resistance than the comparative coating Sample 8, even when a commercial chlorinated polyolefin adhesion promoter was used as a pretreatment. Also, coating Samples 1 and 7 (highest 1,4:1,2 butadiene content) had the best overall adhesive properties and maintained good fuel resistance and appearance.

TABLE 3B

Panels: ETA-3183 TPO    Baking Conditions: 35 minutes at 121° C. (250° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 87.4 | 92.0 | 5, 5, 5, 5 | 5, 5, 5, 5 | 60+ | 0.87 | 1.80 | 0.00 |
| 2 | 86.2 | 92.0 | 4, 4, 3, 3 | 5, 5, 5, 5 | 60+ | 0.88 | 1.81 | 0.00 |
| 3 | 87.0 | 95.0 | 5, 5, 5, 5 | 5, 5, 5, 5 | 60+ | 0.84 | 1.85 | 0.00 |
| 4 | 86.9 | 93.0 | 3, 2, 2, 2 | 5, 5, 5, 5 | 60+ | 0.57 | 1.50 | 0.00 |
| 5 | 22.0 | 7.0 | 5, 5, 5, 5 | 5, 5, 5, 5 | 60+ | 1.15 | 1.88 | 0.00 |
| 6 | 86.7 | 84.0 | 0, 0, 0, 0 | 1, 0, 0, 0 | 60+ | 0.95 | 1.72 | 0.00 |
| 7 | 85.0 | 91.0 | 2, 1, 0, 0 | 5, 5, 5, 5 | 60+ | 0.72 | 1.88 | 0.00 |
| 8 (comparative) | 85.5 | 92.0 | 0, 0, 0, 0 | 0, 0, 0, 0 | 0 | 1.15 | 1.90 | 0.00 |
| MPP4100 coated with Sample 8 (comparative) | 85.7 | 96.0 | 5, 5, 5, 5 | 5, 5, 5, 5 | 40 | 0.82 | 1.48 | 0.15 |

As shown in Table 3B, for ETA-3183 TPO panels baked at a temperature of 121° C. (250° F.), all of the Saturated Hydrocarbon Polymer-containing coatings (Samples 1–7) exhibited better adhesive properties than the comparative Sample 8 coating (without chlorinated polyolefin pretreatment), with the exception of Example 6 which contained the Saturated Hydrocarbon Polymer with the lowest 1,4:1,2 butadiene content (1:9). Again, all coatings (Samples 1–7) containing Saturated Hydrocarbon Polymers according to the present invention had better fuel soak resistance than the comparative coating Sample 8, even when a commercial chlorinated polyolefin adhesion promoter was used as a pretreatment. The coating including the higher Mw Saturated Hydrocarbon Polymer having 1,4:1,2 butadiene content (80:20) (Sample 1) had better gate area initial adhesion than the coating including the lower Mw Saturated Hydrocarbon Polymer having the same 1,4:1,2 butadiene content (Sample 7). Also as shown in Table 3B, the compatibilizer improved adhesion of the 50:50 1,4:1,2 butadiene diol-containing coatings (compare Sample 3 vs. Sample 2 and Sample 5 vs. Sample 4).

TABLE 3C

Panels: D151B TPO  Baking Conditions: 35 minutes at 121° C. (250° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 87.8 | 92.0 | 5, 5, 5, 5 | 5, 5, 5, 5 | 60+ | 0.87 | 1.80 | 0.00 |
| 2 | 87.6 | 94.0 | 5, 5, 5, 5 | 5, 5, 5, 5 | 60+ | 0.88 | 1.81 | 0.00 |
| 3 | 85.0 | 96.0 | 5, 5, 5, 5 | 5, 5, 5, 5 | 60+ | 0.84 | 1.85 | 0.00 |
| 4 | 85.4 | 96.0 | 5, 5, 5, 5 | 5, 5, 5, 5 | 60+ | 0.57 | 1.50 | 0.00 |
| 5 | 23.6 | 6.0 | 5, 5, 5, 5 | 5, 5, 5, 5 | 55 | 1.15 | 1.88 | 0.00 |
| 6 | 85.5 | 91.0 | 5, 5, 5, 5 | 0, 0, 0, 0 | 60 | 0.95 | 1.72 | 0.00 |
| 7 | 86.0 | 97.0 | 5, 5, 5, 5 | 5, 5, 5, 5 | 60+ | 0.72 | 1.88 | 0.00 |
| 8 (comparative) | 87.1 | 97.0 | 0, 0, 0, 0 | 0, 0, 0, 0 | 0 | 1.15 | 1.90 | 0.00 |
| MPP4100 coated with Sample 8 (comparative) | 86.2 | 97.0 | 5, 5, 5, 5 | 5, 5, 5, 5 | 10 | 0.82 | 1.48 | 0.15 |

As shown in Table 3C, for D161B TPO panels baked at a temperature of 121° C. (250° F.), all of the Saturated Hydrocarbon Polymer-containing coatings (Samples 1–7) exhibited better adhesive properties than the comparative Sample 8 coating (without chlorinated polyolefin pretreatment), with the exception of Sample 6 which contained the Saturated Hydrocarbon Polymer with the lowest 1,4:1,2 butadiene content (1:9). All coatings (Samples 1–7) containing Saturated Hydrocarbon Polymer according to the present invention had better fuel soak resistance than the comparative coating Sample 8, even when a commercial chlorinated polyolefin adhesion promoter was used as a pretreatment.

TABLE 3D

Panels: TPO-880  Baking Conditions: 35 minutes at 121° C. (250° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 86.0 | 90.0 | 5, 5, 5, 5 | 5, 5, 5, 5 | 60+ | 0.87 | 1.80 | 0.00 |
| 2 | 86.0 | 93.0 | 5, 5, 5, 5 | 5, 5, 5, 5 | 60+ | 0.88 | 1.81 | 0.00 |
| 3 | 85.4 | 90.0 | 5, 5, 5, 4 | 5, 5, 5, 5 | 60+ | 0.84 | 1.85 | 0.00 |
| 4 | 86.1 | 94.0 | 5, 5, 5, 5 | 5, 5, 5, 5 | 60+ | 0.57 | 1.50 | 0.00 |
| 5 | 23.4 | 5.0 | 5, 5, 5, 5 | 5, 5, 5, 5 | 60+ | 1.15 | 1.88 | 0.00 |
| 6 | 85.0 | 83.0 | 1, 0, 0, 0 | 0, 0, 0, 0 | 60+ | 0.95 | 1.72 | 0.00 |
| 7 | 77.0 | 95.0 | 5, 5, 5, 5 | 3, 2, 2, 2 | 60+ | 0.72 | 1.88 | 0.00 |
| 8 (comparative) | 87.9 | 96.0 | 0, 0, 0, 0 | 0, 0, 0, 0 | 0 | 1.15 | 1.90 | 0.00 |
| MPP4100 coated with Sample 8 (comparative) | 86.6 | 96.0 | 5, 5, 5, 5 | 5, 5, 5, 5 | 10 | 0.82 | 1.48 | 0.15 |

As shown in Table 3D, for TPO 880 panels baked at a temperature of 121° C. (250° F.), all of the Saturated Hydrocarbon Polymer-containing coatings (Samples 1–7) exhibited better adhesive properties than the comparative Sample 8 coating (without chlorinated polyolefin pretreatment), with the exception of Sample 6 which contained the Saturated Hydrocarbon Polymer with the lowest 1,4:1,2 butadiene content (1:9). All coatings (Samples 1–7) containing Saturated Hydrocarbon Polymers according to the present invention had better fuel soak resistance than the comparative coating Sample 8, even when a commercial chlorinated polyolefin adhesion promoter was used as a pretreatment. The coating containing the higher Mw Saturated Hydrocarbon Polymer having 1,4:1,2 butadiene content (80:20) (Sample 1) had better adhesion after humidity exposure than the coating containing the lower Mw Saturated Hydrocarbon Polymer having the same 1,4:1,2 butadiene content (Sample 7).

TABLE 4A

Panels: Sequel 1440 TPO    Baking Conditions: 35 minutes at 129° C. (265° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 88.0 | 91.0 | 5, 5, 5, 5 | 5, 5, 5, 5 | 60+ | 1.00 | 1.64 | 0.00 |
| 2 | 88.0 | 91.0 | 5, 5, 5, 5 | 5, 5, 5, 5 | 60+ | 0.80 | 1.76 | 0.00 |
| 3 | 87.5 | 94.0 | 5, 5, 5, 5 | 5, 5, 5, 5 | 60+ | 0.76 | 1.85 | 0.00 |
| 4 | 85.3 | 90.0 | 5, 5, 5, 5 | 5, 5, 5, 5 | 60+ | 0.62 | 1.45 | 0.00 |
| 5 | 19.4 | 5.0 | 5, 5, 5, 5 | 3, 2, 2, 2 | 60+ | 1.08 | 1.79 | 0.00 |
| 6 | 85.9 | 85.0 | 0, 0, 0, 0 | 0, 0, 0, 0 | 60+ | 0.84 | 1.75 | 0.00 |
| 7 | 87.0 | 97.0 | 5, 5, 5, 5 | 5, 5, 5, 5 | 60+ | 0.80 | 2.00 | 0.00 |
| 8 (comparative) | 86.9 | 96.0 | 0, 0, 0, 0 | 0, 0, 0, 0 | 0 | 1.05 | 1.87 | 0.00 |
| MPP4100 coated with Sample 8 (comparative) | 87.5 | 94.0 | 5, 5, 5, 5 | 5, 5, 5, 5 | 10 | 0.70 | 1.49 | 0.17 |

As shown in Table 4A, for Sequel 1440 TPO panels baked at a temperature of 129° C. (265° F.), each of the coatings containing Saturated Hydrocarbon Polymers (Samples 1–7) exhibited generally better adhesive properties than the comparative Sample 8 coating containing no Saturated Hydrocarbon Polymer, with the exception of Example 6 which contained the Saturated Hydrocarbon Polymer with the lowest 1,4:1,2 butadiene content (10/90) Again, each of the coatings (Samples 1–7) containing Saturated Hydrocarbon Polymers had much better fuel soak resistance than the comparative coating Sample 8, even when a commercial chlorinated polyolefin adhesion promoter was used as a pretreatment. Similar trends in results were observed when the coatings of Samples 1–8 were applied to TPO-880 and D161B panels.

had better gate area initial adhesion than a lower Mw Saturated Hydrocarbon Polymer having the same 1,4:1,2 butadiene content (Sample 7). Also, the compatibilizer improved adhesion of the 50:50 1,4:1,2 butadiene diol-containing coatings (compare Sample 3 vs. Sample 2 and Sample 5 vs. Sample 4).

For all of the coated substrate panels tested above, the panels coated with the higher Mw Saturated Hydrocarbon Polymer having high 1,4:1,2 butadiene content (80:20) (Sample 1) provided generally good adhesion and fuel resistance properties, even at lower bake temperatures (110° C.). Acceptable adhesion also was achieved by coatings using Saturated Hydrocarbon Polymers having lower 1,4 butadiene contents with a compatibilizer and/or with higher bake temperatures.

TABLE 4B

Panels: ETA-3183 TPO    Baking Conditions: 35 minutes at 129° C. (265° F.)

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| 1 | 88.0 | 89.0 | 5, 5, 5, 5 | 5, 5, 5, 5 | 60+ | 1.00 | 1.64 | 0.00 |
| 2 | 87.0 | 90.0 | 4, 4, 4, 4 | 5, 5, 5, 5 | 60+ | 0.80 | 1.76 | 0.00 |
| 3 | 85.6 | 90.0 | 5, 5, 5, 5 | 5, 5, 5, 5 | 60+ | 0.76 | 1.85 | 0.00 |
| 4 | 85.0 | 95.0 | 5, 3, 3, 3 | 5, 5, 5, 5 | 60+ | 0.62 | 1.45 | 0.00 |
| 5 | 25.3 | 7.0 | 5, 5, 5, 5 | 5, 5, 5, 5 | 60+ | 1.08 | 1.79 | 0.00 |
| 6 | 85.6 | 82.0 | 0, 0, 0, 0 | 0, 0, 0, 0 | 60+ | 0.84 | 1.75 | 0.00 |
| 7 | 87.0 | 98.0 | 3, 2, 0, 0 | 5, 5, 5, 5 | 60+ | 0.80 | 2.00 | 0.00 |
| 8 (comparative) | 87.4 | 95.0 | 0, 0, 0, 0 | 0, 0, 0, 0 | 0 | 1.05 | 1.87 | 0.00 |
| MPP4100 coated with Sample 8 (comparative) | 86.4 | 94.0 | 5, 5, 5, 5 | 5, 5, 5, 5 | 60 | 0.70 | 1.49 | 0.17 |

As shown in Table 4B, for ETA-3183 TPO panels baked at a temperature of 129° C. (265° F.), each of the coatings containing Saturated Hydrocarbon Polymers (Samples 1–7) exhibited generally better adhesive properties than the comparative Sample 8 coating containing no Saturated Hydrocarbon Polymer, with the exception of Example 6 which contained the diol with the lowest 1,4:1,2 butadiene content (10/90). Again, each of the coatings (Samples 1–7) containing Saturated Hydrocarbon Polymers had much better fuel soak resistance than the comparative coating Sample 8. The coating containing higher Mw Saturated Hydrocarbon Polymer having 1,4:1,2 butadiene content (80:20) (Sample 1)

The following Examples 2 and 3 show the preparation of various compositions according to the present invention which are useful for coating TPO substrates. The coatings of Example 2 were evaluated as adhesion promoters or primers and the coatings of Example 3 were evaluated as clearcoats.

EXAMPLE 2

For each of the liquid coatings of Example 2 (Samples A–C), the components in the amounts listed in Table 5 were added sequentially to a one pint container under agitation. After all of the components were added, agitation was continued for about 1 minute. Samples A and B were prepared in accordance with the present invention. Sample C is a comparative example which contains Saturated Hydrocarbon Polymer.

TABLE 5

| SAMPLE | A | B | C Comparative |
|---|---|---|---|
| SOLVESSO 150[13] | 100.0 | 100.0 | 100.0 |
| SOLVESSO 100[14] | 200.0 | 200.0 | 200.0 |
| Polytail H Saturated Hydrocarbon Polymer Solution[15] | 190.0 | 190.0 | 0.0 |
| Hardlen 13-MLJ[16] | 0.0 | 50.0 | 0.0 |
| Cymel 1156 | 60.0 | 60.0 | 68.8 |
| Pigment Paste A | 50.6 | 50.6 | 50.6 |
| Pigment Paste B[17] | 82.0 | 82.0 | 82.0 |
| Acrylic Resin A[18] | 118.2 | 118.2 | 135.4 |
| DDBSA Catalyst | 8.4 | 8.4 | 8.4 |

[13]SOLVESSO 150 is an aromatic solvent mixture which is commercially available from Exxon Chemicals America.
[14]SOLVESSO 100 is an aromatic solvent mixture which is commercially available from Exxon.
[15]Polytail H Saturated Hydrocarbon Polymer Solution of 20% resin solids of Polytail H in xylene.
[16]Hardlen 13-MLJ chlorinated polyolefin resin which is commercially available from Toyo Kasai.
[17]Pigment Paste B: white pigment dispersion was prepared from the following materials:
3.3 kg (7.3 lb) of Suspeno #202-X dispersing agent available from Poly-Resyn;
147.3 kg (324.7 lb) of high gloss neutral pH $TiO_2$ from DuPont;
17.3 kg (38.1) of n-butyl acetate;
46.9 kg (103.4 lb) acrylic resin prepared from:
52% Solids

| Weight Percent Solids | 48% Solvent |
|---|---|
| 30% styrene | 67% VM + P Naphtha |
| 20% 2-ethyl hexyl acrylate | 22.2% isobutanol |
| 19.5% butyl methacrylate | 10.8% toluene |
| 18.6% methyl methacrylate | |
| 10.0% hydroxy ethyl acrylate | |
| 1.9% methacrylic acid | |

TABLE 5-continued

[18]Acrylic Resin A having a total weight solids of 63.5% in solvent and an acid value of 8.22 was prepared from the following materials:
36.5% solvent composed of 66% of SOLVESSO 100 and 34% of xylene
63.5% solids composed of:
28.65% of CARDURA-E;
12% of 2-ethyl hexyl acrylate;
19.9% hydroxy ethyl acrylate;
30% styrene
9.45% acrylic acid.
CARDURA-E is a glycidyl ester monoepoxide available form Shell Chemical Co.

Application and Testing of Samples A–C

Each of the coating Samples (A–C) and the commercial chlorinated polyolefin adhesion promoter MPP-4100 were spray applied as adhesion promoters (primers) to individual test panels of various types of thermoplastic polyolefin (TPO) plaques using a hand spray applicator. Each coating sample was applied directly to the surface of the TPO without the aid of any other adhesion promoting layer or oxidizing pretreatment such as flame treatment. Two coats of each coating sample were applied with a 60-second ambient flash between each coat.

After the application of the second coating of adhesion promoter to the sample, an additional ambient flash of 5 minutes was allowed prior to application of CBC-8555C black pigmented basecoat, which is commercially available from PPG Industries, Inc. The basecoat and subsequent clearcoat were applied using a Spraymation application machine. Two coats of basecoat were applied with a 60 second ambient flash between each coat. After the second coat was applied, an additional ambient flash of 90 seconds was allowed prior to application of UCC-1001TA clearcoat, which is commercially available from PPG Industries, Inc. Two coats of clearcoat were applied with a 60 second ambient flash between each coat. After the application of the second coat of clearcoat, an additional ambient flash of 10 minutes was allowed prior to baking of the wet-on-wet coated composite for 35 minutes at 121° C. (250° F.). Each test panel was evaluated for Gloss, DOI, adhesion and fuel soak resistance as reported in Tables 6 and 7.

TABLE 6

Panels: Sequel 1440 TPO

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| MPP4100 | 87.0 | 92.0 | 4, 4, 4, 4 | 5, 5, 5, 5 | 10 | 0.22 | 0.80 | 1.70 |
| A | 87.0 | 82.0 | 5, 5, 5, 5 | 5, 5, 5, 5 | 60+ | 0.27 | 0.80 | 1.70 |
| B | 85.0 | 83.0 | 5, 5, 5, 5 | 5, 5, 5, 5 | 10 | 0.38 | 0.80 | 1.70 |
| C (comparative) | 88.0 | 93.0 | 0, 0, 0, 0 | 0, 0, 0, 0 | 0 | 0.23 | 0.80 | 1.70 |

Similar trends in results were observed when the above coating compositions were applied to the surface of panels of D161B TPO substrate.

TABLE 7

Panels: ETA-3183 TPO

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| MPP4100 | 86.5 | 86.0 | 5, 5, 5, 5 | 5, 5, 5, 5 | 10 | 0.22 | 0.80 | 1.70 |
| A | 86.0 | 87.0 | 5, 5, 5, 5 | 5, 5, 5, 5 | 60+ | 0.27 | 0.80 | 1.70 |

TABLE 7-continued

Panels: ETA-3183 TPO

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| B | 85.0 | 81.0 | 5, 5, 5, 5 | 5, 5, 5, 5 | 60+ | 0.38 | 0.80 | 1.70 |
| C (comparative) | 87.4 | 91.0 | 0, 0, 0, 0 | 0, 0, 0, 0 | 0 | 0.23 | 0.80 | 1.70 |

Similar trends in results were observed when the above coating compositions were applied to the surface of panels of TPO-880 substrate.

For all of the substrates tested, the Saturated Hydrocarbon Polymer-containing adhesion promoters (Samples A and B) provided much better adhesion and fuel resistance than the comparative Sample C containing no Saturated Hydrocarbon Polymer or chlorinated polyolefin. The Saturated Hydrocarbon Polymer-containing adhesion promoters (Samples A and B) provided adhesion and fuel resistance equal to or better than the commercial chlorinated polyolefin based adhesion promoter.

EXAMPLE 3

For each of the liquid coatings of Example 3 (Samples D and E), the components in the amounts listed in Table 8 were added sequentially to a one pint container under agitation. After all of the components were added, agitation was continued for about 1 minute. Sample D was prepared in accordance with the present invention. Sample E is a comparative example which contains no Saturated Hydrocarbon Polymer.

TABLE 8

| EXAMPLE | D | E Comparative |
|---|---|---|
| VM&P Naphtha | 36.0 | 40.0 |
| Microgel A | 37.8 | 37.8 |
| TINUVIN 328 | 8.0 | 8.0 |
| POLYTAIL H Saturated Hydrocarbon Polymer Solution | 196.0 | 0.0 |
| Cymel 1156 | 59.0 | 108.0 |
| Polyester A | 25.0 | 34.6 |
| Polyester B | 35.4 | 48.8 |
| DDBSA Catalyst | 2.8 | 2.8 |

Application and Testing of Samples D and E

Two coats of each of coating Samples D and E were spray applied as clearcoats to individual test panels of various types of thermoplastic polyolefin (TPO) panel using a Spraymation application machine. Each coating sample was applied directly to the TPO panel without the aid of any adhesion promoting layer or oxidizing pretreatment such as a flame pretreatment. The coating samples were applied in two coats with a 60-second ambient flash between coats. After application of the second coat, an additional ambient flash of 10 minutes was allowed prior to baking the coatings. Each coated panel was baked for a total time of 35 minutes at the 121° C. (250° F.).

TABLE 9

Panels: Sequel 1440 TPO

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| D | 80.0 | 32.0 | 5, 5, 5, 5 | 5, 5, 5, 5 | 60+ | 0.00 | 0.00 | 1.34 |
| E (comparative) | 80.0 | 58.0 | 0, 0, 0, 0 | 0, 0, 0, 0 | 0 | 0.00 | 0.00 | 1.70 |

Similar trends in results were observed when the above coating compositions were applied to the surface of panels of D161B TPO substrate.

TABLE 10

Panels: ETA-3183 TPO

| SAMPLE | 20° Gloss | DOI | Initial Adhesion | 10 Day Humidity | 60 min. Fuel | Film Thickness (mils) BC | CC | AP |
|---|---|---|---|---|---|---|---|---|
| D | 77.0 | 37.0 | 5, 3, 3, 3 | 5, 2, 1, 1 | 60+ | 0.00 | 0.00 | 1.34 |
| E (comparative) | 81.0 | 45.0 | 0, 0, 0, 0 | 0, 0, 0, 0 | 0 | 0.00 | 0.00 | 1.70 |

TABLE 11

Panels: TPO-880

| SAMPLE | 20° Gloss | DOI | Initial Adhesion | 10 Day Humidity | 60 min. Fuel | Film Thickness (mils) | | |
|---|---|---|---|---|---|---|---|---|
| | | | | | | BC | CC | AP |
| D | 73.0 | 35.0 | 5, 5, 5, 5 | 5, 3, 3, 3 | 60+ | 0.00 | 0.00 | 1.34 |
| E (comparative) | 81.0 | 43.0 | 0, 0, 0, 0 | 0, 0, 0, 0 | 0 | 0.00 | 0.00 | 1.70 |

As shown in Tables 9–11, for each of the different TPO substrates tested, the Saturated Hydrocarbon Polymer-containing clearcoat according to the present invention had better adhesion and fuel soak resistance than the comparative Sample E which contained no Saturated Hydrocarbon Polymer.

EXAMPLE 4

Compatibilizer A

A compatibilizer for use in the coating composition of the present invention was produced by the following procedure. A 4-liter stainless steel autoclave was charged with 2000 grams of isostearic acid and 6.0 grams of triphenylphosphine, a catalyst. After air was removed from the autoclave under a vacuum and the autoclave was repressurized to 33 kPa, the stirred contents were heated to 85° C. Next, 613 grams of propylene oxide was added over two hours. After 2 hours and 20 minutes, the contents were heated to 100° C. and held at that temperature for 6.5 hours. Then an additional 60 grams of propylene oxide was added. Heating was continued at 100° C. for two hours, then the contents were cooled to 85° C. and vacuum stripped so that no propylene oxide remained. The resultant compatibilizer had an acid value of 2.0, a hydroxyl number of 149.7 and a viscosity of 49.1 centipoise (cp) measured with a Brookfield viscometer fitted with Spindle #1 operating at 60 revolutions per minute (rpm) at 25° C. The percent weight solids was 97 percent measured at 110° C. for 1 hour.

Compatibilizer B

A compatibilizer for use in a coating composition of the present invention was produced by the following procedure. A 2-liter flask equipped with a stirrer, reflux condenser, and a nitrogen atmosphere was charged with 586.16 grams of isostearic acid and 1.70 grams of triphenylphosphine. The contents were stirred and heated to 130° C., and then 266.42 grams of glycidol (50 percent solution in toluene) was added over a one-hour period. The temperature was maintained for 3.5 hours until the acid number had fallen to 1.33. The viscosity of the resultant compatibilizer was 282 cp (Brookfield, Spindle #1, 12 rpm, 25° C.). No epoxide remained in the product and the percent weight solids of the product was 89.1 percent measured at 110° C. for one hour.

Compatibilizer C

A compatibilizer for use in a coating composition of the present invention was produced by the following procedure. A 2-liter flask equipped with a stirrer, reflux condenser, and a nitrogen atmosphere was charged with 1472.8 grams of isostearic acid and 4.26 grams of triphenylphosphine. The contents were stirred and heated to 130° C., and then 767.2 grams of a cycloaliphatic epoxide (3,4-epoxycyclohexylmethyl-3,4-epoxycyclohexane carboxylate, commercially available as ERL-4221 from Union Carbide Corp.) was added over a one-hour period. After the one-hour addition of the ERL-4221, the reaction was maintained at 130° C. for 6 hours and 25 minutes and then cooled. The resultant compatibilizer had an acid value of 5.19, an epoxy equivalent weight of 9471 and a viscosity of 25,200 cp (Brookfield, Spindle #4, 12 rpm, 25° C.). The percent weight solids was 99.84 percent measured at 110° C. for one hour.

Compatibilizer D

A compatibilizer for use in a coating composition of the present invention was produced by the following procedure. A 5-liter flask equipped with a nitrogen atmosphere, steam condenser and condenser with receiver and stirrer was charged with 2946 grams of isostearic acid and 1252 grams of di-trimethylolpropane, commercially available from Perstorp Specialty Chemical Products affiliate of Perstorp AB, Sweden. The contents were stirred and heated to 227° C. over 13.75 hours, and water was removed by distillation. A total of 174.6 grams of distillate was collected. Distillation was continued for an additional 3.75 hours at 213 to 227° C., and produced a compatibilizer having an acid value of 1.79 and a viscosity of 1040 cp (Brookfield, Spindle #2, 12 rpm, 25° C.). The total weight solids were 99.56 percent measured at 110° C. for one hour.

Saturated Hydrocarbon Polymer E

A Saturated Hydrocarbon Polymer having terminal acid groups was prepared by the following procedure. In a one liter flask equipped with a stirrer, reflux condenser, and nitrogen atmosphere, 360 grams of KRATON LIQUID POLYMER L-2203 (a polybutadiene diol polymer commercially available from Shell Chemical Co., Houston, Tex.) was heated to 110° C. Then 30.8 grams of hexahydrophthalic anhydride was added over 30 minutes and heating was continued at 110° C. to 114° C. for 5.3 hours. The material was then cooled to ambient temperature. IR spectrum showed only a trace of remaining anhydride.

Saturated Hydrocarbon Polymer F

A Saturated Hydrocarbon Polymer having terminal amide groups was prepared by the following procedure. A 2 liter flask equipped with a stirrer, receiver and condenser, and nitrogen atmosphere was charged with 720 grams of KRATON LIQUID POLYMER L-2203, 13.05 grams of potassium hydroxide pellets, 0.644 grams of 18-Crown-6 (available from Aldrich Chemical Co.), and 460 grams of toluene. The contents were heated to reflux and water was removed with the aid of a Dean-Stark water separator, until no more water distilled. Then 18.7 grams of 2-chloroacetamide was added. The contents were heated to 100° C. over about 3 hours. Upon cooling, 252 grams of water were added, stirred rapidly to mix and the mixture was allowed to settle. Upon settling, the lower phase (187 grams) was separated and discarded. The sample was extracted again in a separatory funnel with 187 grams of water. The lower phase was again separated and discarded. Azeotropic distillation of the product, until no more water distilled, resulted in the final diamide solution having a viscosity of 2100 centipoise cp (Brookfield, Spindle #2, 12 rpm, 25° C.), a total weight solids of 85.5% measured at 110° C. for one hour. The IR spectrum had a broad amide band at 1655 $cm^{-1}$.

Saturated Hydrocarbon Polymer G

A Saturated Hydrocarbon Polymer having terminal carbamate groups was prepared by the following procedure. A one liter flask equipped for vacuum distillation with a nitrogen blanket was charged with 170 grams KRATON LIQUID POLYMER L-2203, 0.31 grams of butyl stannoic acid and 35.0 grams of O-(1-methoxy-2-propyl) carbamate. The contents were heated to 140° C., then vacuum was applied slowly to about 5 mm Hg, and 29.82 grams of 1-methoxy-2-propanol was distilled over about one hour. The final carbamate functional polymer had an hydroxyl number of 24.1, and an $M_n$ of 6282 and an $M_w$ of 7491 as measured by GPC.

Coating Composition 1

A coating composition of the present invention, utilizing compatibilizer B, was prepared in the following manner. To a 150 milliliter container was added, under agitation, the following components in the order listed. After all components were added, agitation was continued for approximately two minutes.

| Component | Weight in grams |
| --- | --- |
| n-amyl alcohol | 5.0 |
| Compatibilizer B | 4.4 |
| White pigment paste[1] | 25.0 |
| CYMEL 1156[2] | 5.5 |
| Polyester polymer[3] | 1.0 |
| L-2203[4] | 1.0 |
| DDBSA[5] | 0.4 |

[1]White pigment paste B, see Example 2, footnote 17.
[2]Melamine formaldehyde resin available from Cytec Industries, Inc.
[3]A polyester polymer having a total weight solids of 77.9% and an acid value of 8.54 was prepared from the following materials:
i) 2,500.0 lb. (1134 kg) 2,2,4-Trimethyl 1,3-Pentanediol
ii) 1,346.0 lb. (610.5 kg) Hexahydrophthalic Anhydride
iii) 7.7 lb. (3.5 kg) Dibutyltin oxide
iv) 400.0 lb. (181 kg) Methyl Isobutyl Ketone
[4]A polybutadiene diol polymer available from Shell Chemical Co. as KRATON LIQUID POLYMER L-2203.
[5]Dodecyl benzene sulfonic acid, 70% solution in isopropanol.

Coating Composition 2

A coating composition of the present invention, utilizing compatibilizer C, was prepared in the following manner. To a 150 milliliter container was added, under agitation, the following components in the order listed. After all components were added, agitation was continued for approximately two minutes.

| Component | Weight in grams |
| --- | --- |
| Toluene | 30.0 |
| Compatibilizer C | 10.0 |

-continued

| Component | Weight in grams |
| --- | --- |
| L-2203 | 2.0 |
| TINUVIN 328[1] | 4.0 |
| CYMEL 1130 crosslinker[2] | 35.0 |
| Polyester polymer[3] | 38.4 |
| Microgel[4] | 11.4 |
| DDBSA | 1.4 |

[1]2-(2'-Hydroxy-3',5'-ditert-amylphenyl) benzotriazole UV light stabilizer available from Ciba-Geigy Corp.
[2]A melamine formaldehyde resin available from Cytec, Inc.
[3]A polyester polymer having a total weight solids of 88.5% and an acid value of 8.14 was prepared from the following materials:
i) 300.7 lb. (136.4 kg) 1,6 hexanediol
ii) 183.1 lb.(83.1 kg) Hexahydrophthalic Anhydride
iii) 115.8 lb. (52.5 kg) Adipic Acid
iv) 27.2 g Butyl Stannoic Acid
v) 139.9 g Triphenyl Phosphate
vi) 62.2 lb. (28.2 kg) Methyl Isobutyl Ketone
[4]A polymeric microparticle composition prepared according to U.S. Pat. No. 4,147,688, Example II.

Coating Composition 3

A coating composition of the present invention, utilizing compatibilizer A 4, was prepared in the following manner. To a 150 milliliter container was added, under agitation, the following components in the order listed. After all components were added, agitation was continued for approximately two minutes.

| Component | Weight in grams |
| --- | --- |
| Toluene | 10.0 |
| Compatibilizer A | 10.3 |
| L-2203 | 4.0 |
| TINUVIN 328 | 4.0 |
| CYMEL 1156 | 30.0 |
| Microgel[1] | 11.4 |
| CYMEL 1130 crosslinker | 5.0 |
| Polyester polymer[2] | 32.6 |
| Black pigment paste[3] | 38.6 |
| DDBSA | 1.4 |

[1]A polymeric microparticle composition prepared according to U.S. Pat. No. 4,147,688 Example II.
[2]See note 3 of Example 1 above.
[3]A black pigment paste was prepared from the following materials:
i) 14.5 lb. (6.6 kg) of n-butyl acetate
ii) 0.8 lb. (0.4 kg) of Suspeno #200-X
iii) 31.6 lb. (14.3 kg) of Monarch 1300 Carbon Black from Cabot Corp.
iv) 144.1 lb. (65.4 kg) of an acrylic resin consisting of:

| 52.0% Solids (wt % of Solids) | 48.0% Solvent |
| --- | --- |
| 29.9% Styrene | 65.7% VM+P Naphtha |
| 19.9% 2-Ethyl Hexyl Acrylate | 21.9% Isobutanol |
| 19.4% Butyl Methacrylate | 11.5% Toluene |
| 17.9% Methyl Methacrylate | |
| 10.0% Hydroxy Ethyl Acrylate | |
| 1.9% Methacrylic Acid | |
| 0.6% Acrylic Acid | |
| 0.4% Propyleneimine | |

Coating Composition 4

A coating composition of the present invention, utilizing the resinous material compatibilizers of two polyester polymers that also function as film-forming polymers, was prepared in the following manner. To a 150 milliliter container was added, under agitation, the following components in the order listed. After all components were added, agitation was continued for approximately two minutes.

| Component | Weight in grams |
| --- | --- |
| Aromatic 150[1] | 1.0 |
| Toluene | 10.0 |
| Compatibilizer D | 5.0 |
| CYMEL 1130 | 11.7 |
| TINUVIN 328 | 1.3 |
| Microgel[2] | 3.8 |
| L-2203 | 0.8 |
| Polyester polymer[3] | 2.1 |
| Polyester polymer[4] | 10.0 |
| Black pigment paste[5] | 12.9 |
| DDBSA | 0.5 |

[1] Aromatic solvent blend available from Exxon Chemicals, Inc.
[2] A polymeric microparticle composition prepared according to U.S. Pat. No. 4,147,688, Example II.
[3] A polyester polymer having a total weight solids content of 80.8% and an acid value of 0.1 prepared from 59.02 grams of Emery 3316-40 Dimer Diol available from Henkel, Inc.
[4] A polyester polymer having a total weight solids content of 79.6% and an acid value of 10.3 prepared in accordance with U.S. Pat. No. 4,465,815 Example 1, except that no catalyst was used.
[5] See footnote 3 of Example 3 above.

Coating Compositions 5–8 and Comparative Coating Compositions 1 and 2

Coating compositions 5–8 were prepared according to the present invention. Comparative Samples 1 and 2 were prepared without the use of Saturated Hydrocarbon Polymers. To prepare each coating composition, the following materials were added to a 150 milliliter container, under agitation, in the order listed. After all components were added, agitation was continued for approximately two minutes.

| | Weight in Grams | | | | | |
| --- | --- | --- | --- | --- | --- | --- |
| Coating composition | 5 | 6 | 7 | 8 | Comparative 1 | Comparative 2 |
| Toluene | 15.0 | 15.0 | 15.0 | 10.0 | | |
| SOLVESSO | | | | | 2.5 | |
| Xylene | | | | | | 10.0 |
| CYMEL 1130 | 15.5 | 15.5 | 15.5 | 10.0 | | 10.0 |
| CYMEL 1156 | | | | | 5.2 | |
| Compatibilizer C | 8.8 | 8.8 | 8.8 | | | 3.0 |
| Diacid E | 8.2 | | | | | |
| Diamide F | | 9.6 | | | | |
| Carbamate functional polymer G | | | 8.2 | | | |
| L-2203 | | | | 3.0 | | |
| Polyester polymer[1] | 1.7 | 1.7 | 1.7 | 10.0 | 6.1 | 3.0 |
| DDBSA | 0.5 | 0.5 | 0.5 | 0.4 | 0.2 | 0.4 |

[1] Polyester polymer described in footnote 3 of Coating Composition 1 above.

The coating compositions of Samples 1 through 8 and the Comparative Samples 1 and 2 were each separately applied directly to thermoplastic olefin (TPO) test panels (DF880 available from D&S Plastics) with a #34 wire draw down bar. The panels were allowed to flash at ambient temperature for 5 minutes and were then baked at 265° F. (129° C.) for 30 minutes. The dry film thickness of the resultant cured coating on the test panels ranged from 0.5 to 0.7 mils (12.7 microns to 17.8 microns).

The test panels were cross-hatched and tested for adhesion using Nichi-ban LP-24 tape as described in Example 1 above. The adhesion testing was rated using the ASTM Standard Test Method: D3359-95a "Meaning Adhesion by Tape Test" test classification scale. The scale ranges from 0 B to 5 B with 0 B meaning severe delamination of the coating from the substrate and 5 B meaning no delamination. The results of Table 12 show that the coatings of the present invention exhibited acceptable to good cross hatch ratings, better than those of Comparative Coating Compositions 1 and 2. The former of these comparative examples lacked both the Saturated Hydrocarbon Polymer and the compatibilizer and the latter lacked the Saturated Hydrocarbon Polymer.

TABLE 12

| EXAMPLE # | CROSS-HATCH RATING |
| --- | --- |
| 1 | 5B |
| 2 | 5B |
| 3 | 3B |
| 4 | 3B |
| 5 | 5B |
| 6 | 5B |
| 7 | 5B |
| 8 | 5B[1] |
| COMPARATIVE 1 | 0B |
| COMPARATIVE 2 | 0B |

[1] Some dewetting of the TPO plastic substrate was observed with this coating after application to the TPO, and some phase separation of the polybutadiene diol polymer and the polyester polymer was observed in the liquid coating composition prior to application to the TPO. Such phenomena as this type of dewetting and phase separation can be overcome by adding solvents such as alcohol and/or surfactants such as fluorocarbon surfactants.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A coating composition comprising:
   (a) a crosslinkable film-forming system present in an amount ranging from about 75 to about 99.9 weight percent on a basis of total resin solids of the coating composition, the crosslinkable film-forming system comprising:
      (i) at least one crosslinkable film-forming resin; and
      (ii) at least one crosslinking material selected from the group consisting of aminoplasts, polyacids, anhydrides and mixtures thereof, the at least one crosslinking material being capable of reacting with the film-forming resin to form a crosslinked film; and
   (b) at least one adhesion promoting agent comprising a substantially saturated, predominantly hydrocarbon polymer comprising a substantially hydrogenated polydiene having a polymer backbone structure with less than about 30 weight percent of branched monomer units and having at least about 85 weight percent of hydrocarbon units and less than about 10 weight percent of carbon to carbon double bonds, said adhesion promoting agent having an average of more than one pendant or terminal polar group per molecule which is capable of reacting with the crosslinking material, the at least one adhesion promoting agent being present in an amount ranging from about 0.1 to about 25 weight percent on a basis of total resin solids of the coating composition.

2. The coating composition according to claim 1, wherein the coating composition is in the form of a liquid.

3. The coating composition according to claim 1, wherein the coating composition is in the form of a powder.

4. The coating composition according to claim 1, wherein the coating composition is selected from the group consisting of a primer composition, a topcoat composition, a basecoat composition that is part of a basecoat-clearcoat composite, and a clearcoat composition that is part of a basecoat-clearcoat composite.

5. The coating composition according to claim 1, wherein the crosslinkable film-forming resin is selected from the group consisting of hydroxy functional polyester oligomers or polymers, carbamate functional polyester oligomers or polymers, hydroxy functional acrylic oligomers or polymers, carbamate functional acrylic oligomers or polymers, hydroxy functional urethane oligomers or polymers, carbamate functional urethane oligomers or polymers, epoxy functional acrylic oligomers or polymers and mixtures thereof.

6. The coating composition according to claim 1, wherein the crosslinkable film-forming resin is present in an amount ranging from about 25 to about 85 weight percent based upon total resin solids of the coating composition.

7. The coating composition according to claim 1, wherein the crosslinking material is an aminoplast selected from the group consisting of methylated melamine formaldehyde resins, butylated melamine formaldehyde resins, isobutylated melamine formaldehyde resins and mixtures thereof.

8. The coating composition according to claim 1, wherein the crosslinking material is present in an amount ranging from about 15 to about 50 weight percent based on total resin solids of the coating composition.

9. The coating composition according to claim 1, wherein the adhesion promoting agent comprises saturated butadiene units.

10. The coating composition according to claim 1, wherein the adhesion promoting agent is free of saturated isoprene units.

11. The coating composition according to claim 1, wherein the adhesion promoting agent is a substantially saturated polyhydroxylated polydiene polymer.

12. The coating composition according to claim 11, wherein the substantially saturated polyhydroxylated polydiene polymer is a substantially saturated polybutadiene diol polymer.

13. The coating composition according to claim 12, wherein said polybutadiene diol polymer has a ratio of 1,4:1,2 butadiene of at least 80:20.

14. The coating composition according to claim 1, wherein the adhesion promoting agent is present in an amount ranging from about 1 to about 20 weight percent based upon total resin solids of the coating composition.

15. The coating composition according to claim 1, further comprising at least one pigment.

16. The coating composition according to claim 1, wherein the coating composition is essentially free of monohydroxylated diene polymers.

17. A plastic article having a surface which is at least partially coated with a coating composition directly onto the plastic article without the aid of a flame or corona pretreatment or the use of an adhesion promoter or tie coat, the coating composition comprising:

(a) a crosslinkable film-forming system present in an amount ranging from about 75 to about 99.9 weight percent on a basis of total resin solids of the coating composition, the crosslinkable film-forming system comprising:
    (i) at least one crosslinkable film-forming resin; and
    (ii) at least one crosslinking material selected from the group consisting of aminoplasts, polyacids, anhydrides and mixtures thereof, the at least one crosslinking material being capable of reacting with the film-forming resin to form a crosslinked film; and (b) at least one adhesion promoting agent comprising a substantially saturated, predominantly hydrocarbon polymer comprising a substantially hydrogenated polydiene having a polymer backbone structure with less than about 30 weight percent of branded monomer units and having at least about 85 weight percent of hydrocarbon units and having less than about 10 weight percent of carbon to carbon double bonds, said adhesion promoting agent having an average of more than one pendant or terminal polar group per molecule which is capable of reacting with the crosslinking material, the at least one adhesion promoting agent being present in an amount ranging from about 0.1 to about 25 weight percent on a basis of total resin solids of the coating composition.

* * * * *